United States Patent [19]
Nakagawa et al.

[11] Patent Number: 5,446,543
[45] Date of Patent: Aug. 29, 1995

[54] METHOD AND APPARATUS FOR EXTRACTING A PATTERN OF COLOR FROM AN OBJECT USING A NEURAL NETWORK

[75] Inventors: Kazuyo Nakagawa, Kanagawa; Toshio Sato, Tokyo, both of Japan

[73] Assignee: Kabushiki Kaisha Toshiba, Kawasaki, Japan

[21] Appl. No.: 95,256

[22] Filed: Jul. 22, 1993

[30] Foreign Application Priority Data

Jul. 24, 1992 [JP] Japan .................................. 4-198378
Dec. 10, 1992 [JP] Japan .................................. 4-330327
Dec. 14, 1992 [JP] Japan .................................. 4-332990

[51] Int. Cl.[6] .................................................. G01N 21/25
[52] U.S. Cl. ........................................ 356/405; 358/518
[58] Field of Search .............. 358/518, 519, 520, 521, 358/522, 523, 530, 531, 80; 356/405, 425, 402

[56] References Cited

U.S. PATENT DOCUMENTS

| | | | |
|---|---|---|---|
| 4,819,077 | 4/1989 | Kikuchi et al. | 358/520 |
| 5,109,275 | 4/1992 | Naka et al. | 358/518 |
| 5,162,899 | 11/1992 | Naka et al. | 358/518 |
| 5,185,850 | 2/1993 | Usui et al. | 358/518 |
| 5,200,816 | 4/1993 | Rose | 358/518 |
| 5,237,401 | 8/1993 | Koike et al. | 358/518 |

FOREIGN PATENT DOCUMENTS 0235460 9/1987 European Pat. Off. .
2-67689 3/1990 Japan .
3191482 8/1991 Japan .

OTHER PUBLICATIONS

"Precise Color Communication", Minolta Camera Co., Ltd., 1989.
Technical report of IEICE., NC 90-129, pp. 103-108; M. Nakano et al.
Technical report of IPSJ., CV64-4, pp. 25-32; S. Tominaga; 1990.

Primary Examiner—F. L. Evans
Assistant Examiner—Peter J. Rashid
Attorney, Agent, or Firm—Cushman, Darby & Cushman

[57] ABSTRACT

A pattern extracting apparatus extracts a pattern of a desired color from an object containing a plurality of color patterns. In the apparatus, the object is irradiated by light to provide data relating to color components and the data relating to color components are converted into Munsell color data H (Hue), V (Value) and C (Chroma). After that, a pattern of a specific color is extracted from the object based on the Munsell color data.

3 Claims, 20 Drawing Sheets

| V | C | H | Y | x | y |
|---|---|---|---|---|---|
| 9 | 6 | $2.5R = \frac{39}{40} \times 2\pi$ | 78.66 | 0.3665 | 0.318 |
| 9 | 4 | 2.5R | 78.66 | 0.3445 | 0.3179 |
| 9 | 2 | 2.5R | 78.66 | 0.3220 | 0.3168 |
| 9 | 1 | 2.5R | 78.66 | — | — |
| 8 | 10 | 2.5R | 59.10 | 0.4125 | 0.3160 |
| 8 | 8 | 2.5R | 59.10 | 0.3900 | 0.3171 |
| 8 | 6 | 2.5R | 59.10 | 0.3671 | 0.3175 |
| ⋮ | ⋮ | ⋮ | ⋮ | ⋮ | ⋮ |

|  |  |
|---|---|
| H | $5G = \frac{22}{40} \times 2\pi$ |
| V | 7 |
| C | 9 |
| BASIC COLOR NAME | GREEN |
| SYSTEM COLOR NAME | LIGHT GREEN |
| IDIOMATIC COLOR NAME | COBALT GREEN |

PLEASE INPUT AN EXTRACTED COLOR NAME          GREEN

METHOD AND APPARATUS FOR EXTRACTING A PATTERN OF COLOR FROM AN OBJECT USING A NEURAL NETWORK

BACKGROUND OF THE INVENTION

1. Field of the Invention

The present invention relates to a pattern extracting apparatus which extracts a specific area such as a character section or a pattern section from a multicolored image in which, for instance, a character section and a pattern section are mixed.

2. Related Art of the Invention

A method to extract only a character section as a specific area out of a multicolored image in which the character section and the pattern section are mixed has been disclosed in the Japanese Laid-Open Patent Publicaition No. 03-191482. In this disclosed method, an image is divided according to the R (Red), G (Green) and B (Blue) color space and a required area only is extracted.

On the other hand, it has been also attempted to get color information according to a coordinate system which is close to human perceptive characteristic instead of RGB color space. One of the color spaces which are approximate to this human perceptive characteristic is the L*a*b* color space which has been specified by the CIE (International Commission on Illumination) furthermore a conversion expression has been made.

In addition, the handling of color information close to color names characterized by human color perception has been disclosed in the Japanese Laid-Open Patent Publication No. 02-67689. In this disclosure, it has been proposed to divide an image by grouping proper ranges after converting three primary color values into a color space approximate to human perceptive characteristic.

When extracting a specific area from a color image, the image was divided according to (1) three primary color values, (2) a color space approximate to human perceptive characteristic converted from the three primary color values or (3) a set expressed by color names based on the approximated color space. However, this method has such problems as described below.

(1) The three primary color space of RGB is a distorted space which is not uniform when viewed from human perceptive characteristic. Therefore, no sufficient accuracy is obtained when a color image is divided according to this coordinate system.

(2) The problem in (1), above can be improved in case of a space approximated to human perceptive characteristic from three primary color values, for instance, the L*a*b* color space. However, when compared with the Munsell color system which experimentally represented human perceptive characteristic, its error is large.

(3) As described above, the approximating accuracy of this color space is not sufficient. Therefore, the result of division of a color image corresponding to human senses cannot be obtained from classification of color names based on the approximated color space.

Thus, a specific area cannot be precisely extracted from a multicolored image precisely.

SUMMARY OF THE INVENTION

It is an object of the present invention to provide a pattern extracting apparatus which is capable of precisely extracting a specific area corresponding to human sense precisely.

According to the present invention, there is provided apparatus for extracting a pattern of a desired color from an object containing a plurality of color patterns. The apparatus includes a mechanism for irradiating light on the object; a mechanism for detecting the light from the object and for providing data relating to color components; a mechanism for converting the data relating to color components into Munsell color data H (Hue), V (Value) and C (Chroma); and a mechanism for extracting a pattern of a specific color from the object based on the Munsell color data.

Further, according to the present invention there is provided a method for extracting a pattern of a specific color from an object containing a plurality of color patterns. The method comprises the steps of collecting data relating to color components from the object; converting the data relating to color components into Munsell color data H (Hue), V (Value) and C (Chroma); and extracting a pattern of a specific color from the object based on the Munsell color data obtained in the converting step.

DETAILED DESCRIPTION OF THE PREFERRED EMBODIMENTS

Hereinafter, the preferred embodiments of the present invention will be described with reference to the drawings.

Figure 1:
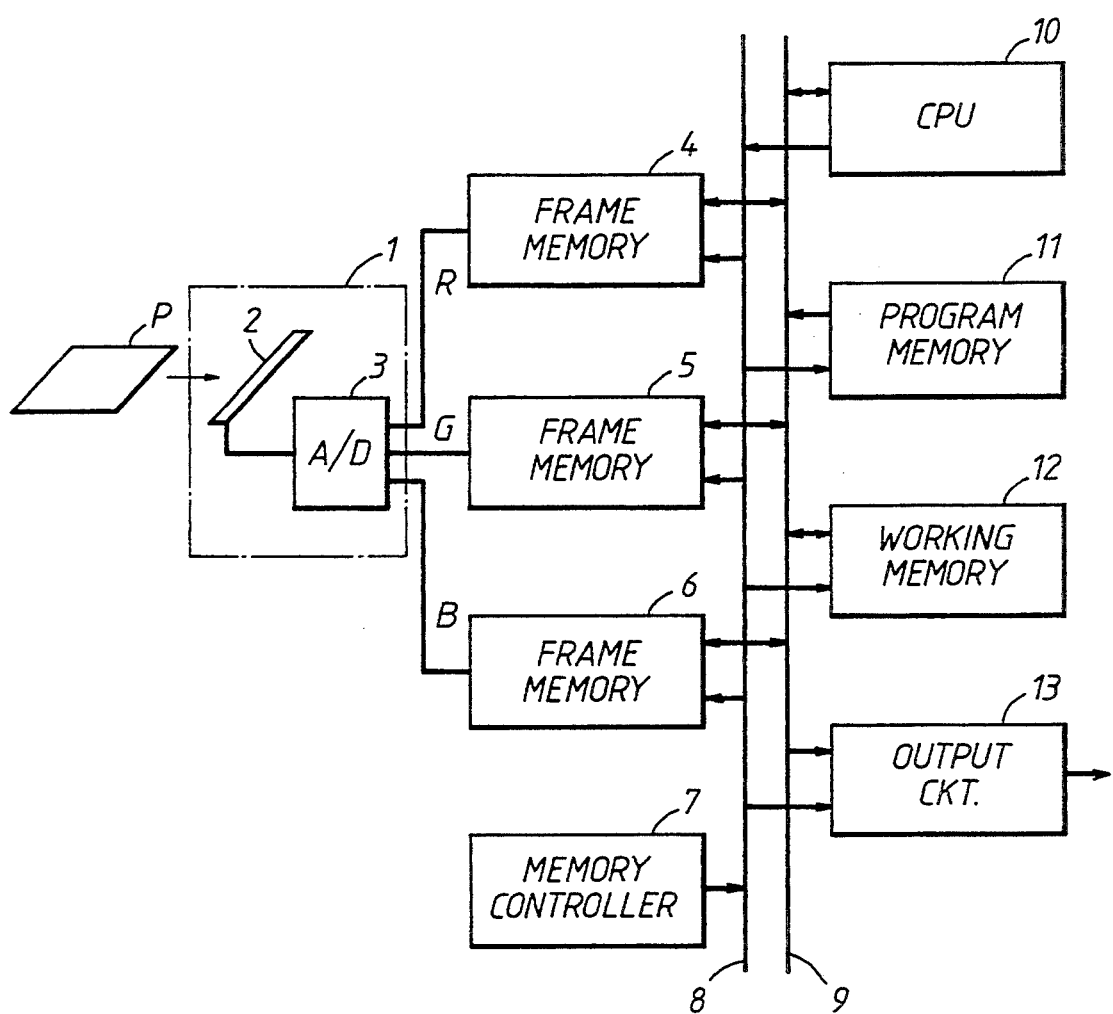
FIG. 1 is a block diagram showing a construction of a pattern extracting apparatus of the present invention.

FIG. 1 shows the construction of a pattern extracting apparatus involved in a first embodiment of the present invention. Reference sign P shows an object to be read, for instance, a full colored document such as a gravure magazine containing multicolored images in which character sections and pattern sections are mixed. The object P is transported in the arrow direction as shown. When the object P being transported passes through a color image input device 1, which serves as a data collecting means, image data of RGB components on the entire surface are read and input to the pattern extracting apparatus.

In the color image input device 1, a color line sensor 2 scans the surface of the object P optically in the direction perpendicular to its transporting direction and photoelectrically converts the information on the surface into signals. The photoelectrically converted signals are sent to an A/D converter 3. The A/D converter 3 converts the input photoelectrically converted signals into RGB digital signals and outputs them as RGB digital image data, respectively.

RGB image data which are output from the color image input device 1 are stored in frame memories 4, 5 and 6, respectively. The frame memories 4, 5 and 6 are controlled by a memory controller 7, respectively and are connected to a CPU (Central Processing Unit) 10 through an address bus 8 and a data bus 9. The CPU 10 performs the entire control. A program memory (ROM) 11 storing a control program of the CPU 10, a working memory (RAM) 12 of the CPU 10 and a data output circuit 13 which outputs data to the outside are connected to the CPU 10 through the address bus 8 and the data bus 9.

The process operation of the pattern extracting apparatus in the construction as described above will now be explained. When the object P is transported in the arrow direction and passes through the color line sensor 2, color image data on the object P are photoelectrically converted into signals. The photoelectrically converted signals are sent to the A/D converter 3. The A/D converter 3 converts the photoelectrically converted signals received from the color line sensor 2 into RGB digital image data. The converted RGB color image data are stored in the frame memories 4, 5 and 6, respectively under the control of the memory controller 7.

Then, when the storage of the image data in the frame memories 4, 5 and 6 is completed, the control of the frame memories 4, 5 and 6 is turned over to the CPU 10. Thereafter, the CPU 10 executes the processes described below according to the program for the process procedures stored in the program memory 11.

Figure 2:
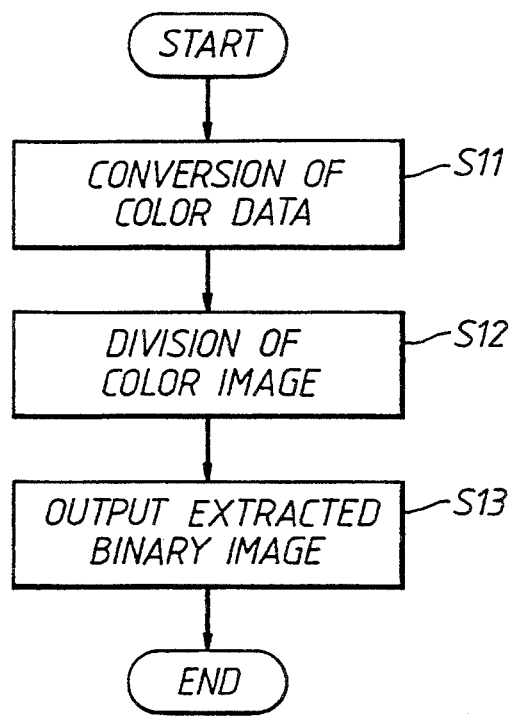
FIG. 2 is a flowchart for explaining the process procedures of the pattern extracting apparatus of the present invention.

In the program memory 11, for instance, a program for executing the process shown in the flowchart shown in FIG. 2 has been stored. The CPU 10 executes the process according to this program. First, the CPU 10 converts the color image data stored in the frame memories 4, 5 and 6 into color data which are three attributes of color perception (S11) and then, extracts a specific area by dividing areas (S12) and outputs the extracted binary image (S13).

More specifically, in the process in Step S11, color image data is converted into the Munsell color system which specifies the JIS Standard Color Patches that are generally used widely. For instance, when RGB values according to the NTSC (National Television Standard Committee) system are output from the color image input device 1, it is necessary that H (Hue), V (Value) and C (Chroma) values, which are three attributes of the Munsell color system, are output when RGB values of the NTSC system are input.

Figures 27, 28:
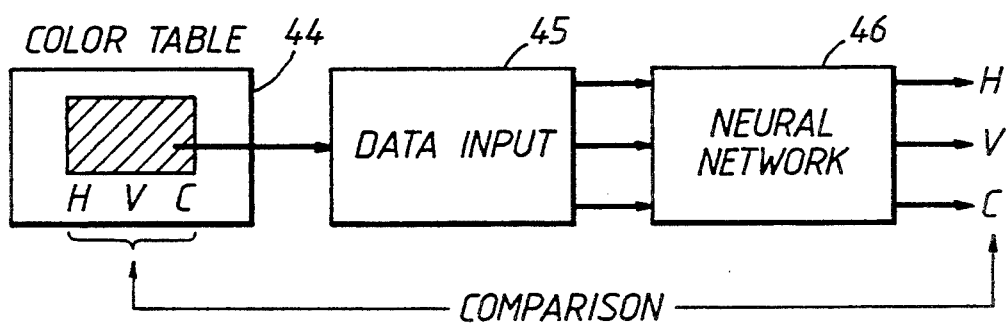
FIG. 27 is a diagram showing an example of a color conversion table which is used in the study of the neural network in the fourth embodiment.
FIG. 28 is a diagram for explaining another method to study the neural network in the fourth embodiment.

On the other hand, in the standard table of color system with three attributes standardized by the JIS, the correspondence between chromaticity coordinates x, y and luminous reflectance Y and HVC values of the Munsell color system is clarified as shown in FIG. 27. Therefore, by using this standard table of color system with three attributes, xyY values can be converted into HVC values. It is further publicly known that RGB values of the NTSC system can be converted into xyY values according to the expression (1) shown below:

$$\begin{bmatrix} R \\ G \\ B \end{bmatrix} = \begin{bmatrix} 1.9106 & -0.5326 & -0.2883 \\ -0.9843 & 1.9984 & -0.0283 \\ 0.0584 & 0.1185 & 0.8985 \end{bmatrix} \begin{bmatrix} X \\ Y \\ Z \end{bmatrix} \quad (1)$$

where, $X = x/y \times Y$, $Z = (1 - x - y)/y \times Y$

Therefore, two kinds of constructions shown below can be considered for the correspondence between the RGB values of the NTSC system and the HVC values of the Munsell color system. That is, one is a method to convert the RGB values of the NTSC system into the xyY values according to the expression (1) and obtain the HVC values from the xyY values according to the conversion table (FIG. 27), and the other is a method to use the conversion table by rewriting it to the correspondence table of the RGB values of the NTSC system to the HVC value.

In both of the above two methods, it is not possible to execute the conversion by the table accurately according to the expression. In this embodiment, this conversion process is achieved using a neural network. In order to realize the conversion process, the neural network is composed of three input units corresponding to the RGB values of the NTSC system and three output units corresponding to the HVC values of the Munsell color system.

Figure 3:
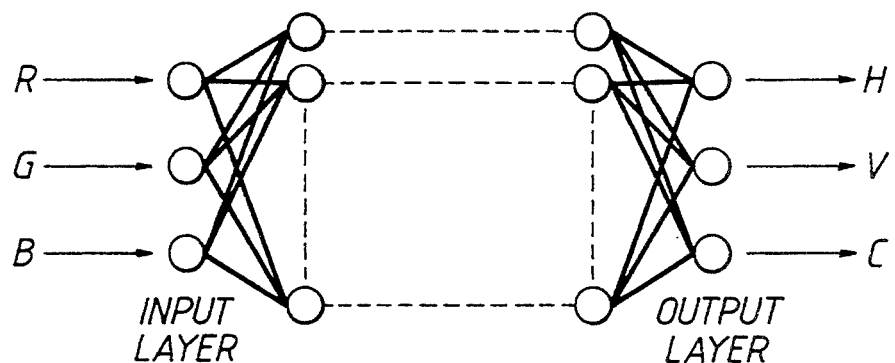
FIG. 3 is a diagram showing the construction of a neural network for realizing the conversion of RGB values into HVC values on the pattern extracting apparatus of the present invention.

The neural network is learned using, for instance, a neural network in the tree structure as shown in FIG. 3 according to an error back propagation method. Here, the learning method is performed based on the correspondence of known xyY values on the conversion table and HVC values of the Munsell color system. That is respective outputs corresponding to xyY values to be input to the neural network, or RGB values of the NTSC system which are converted from the xyY values according to the expression (1), will approach to the corresponding HVC values. And, if the preset conditions have been satisfied, the learning will end.

It is possible to convert RGB values of the NTSC system which are output from the color image input device 1 into HVC values of the Munsell color system using the learning completed neural network.

Further, as a modified example of the color data conversion process in this Step S11, a case where the output from the color image input device 1 does not correspond to RGB values of the NTSC system will be described. To be concrete, if three output values from the color image input device 1 are unknown but the correspondence between these three output values and HVC values of the Munsell color system is known or between these three output values and RGB values of the NTSC system is known, it is possible to correlate the three output values with HVC values of the Munsell color system by either of two methods described below.

That is, one method is to correlate output values from the color image input device 1 with HVC values of the Munsell color system and the other is to convert the output values from the color image input device 1 into RGB values of the NTSC system and then, convert the RGB values of the NTSC system into xyY values according to the expression (1) and obtain HVC values from the xyY values according to the conversion table.

However, in both of the above two methods, it is not possible to make the conversion accurately according to the expression similar to the color data conversion process described above. In this embodiment, this conversion process is achieved using the neural network. Similar to the color data conversion process described above, in order to achieve the conversion process this neural network is composed of three input units corresponding to output values of the color image input device 1 and three output units corresponding to HVC values of the Munsell color system.

The neural network is to be learned according to the error back propagation method similar to the color data conversion process described above. Here, learning is performed so that output values from the color image input device 1 to be input to the neural network or RGB values of the NTSC system which were converted from the output values will become close to corresponding HVC values based on the correspondence between the known output values from the color image input device 1 or xyY values with HVC values of the Munsell color system. If preset conditions have been satisfied, the learning will end.

It is possible to convert output values from the color image input device 1 into HVC values of the Munsell color system using the learning completed neural network.

Then, the area dividing process is executed in Step S12. This area division process is executed in the HVC space of the Munsell color system converted by the color data conversion process in the Step S11. These HVC values represent hue (H), value (V) and chroma (C), which are psychological quantities of colors, respectively. Hue (H) defines a difference among colors such as red, blue and yellow, value (V) represents a scale of lightness of color and chroma (C) represents a scale to show definition of color.

Figure 4:
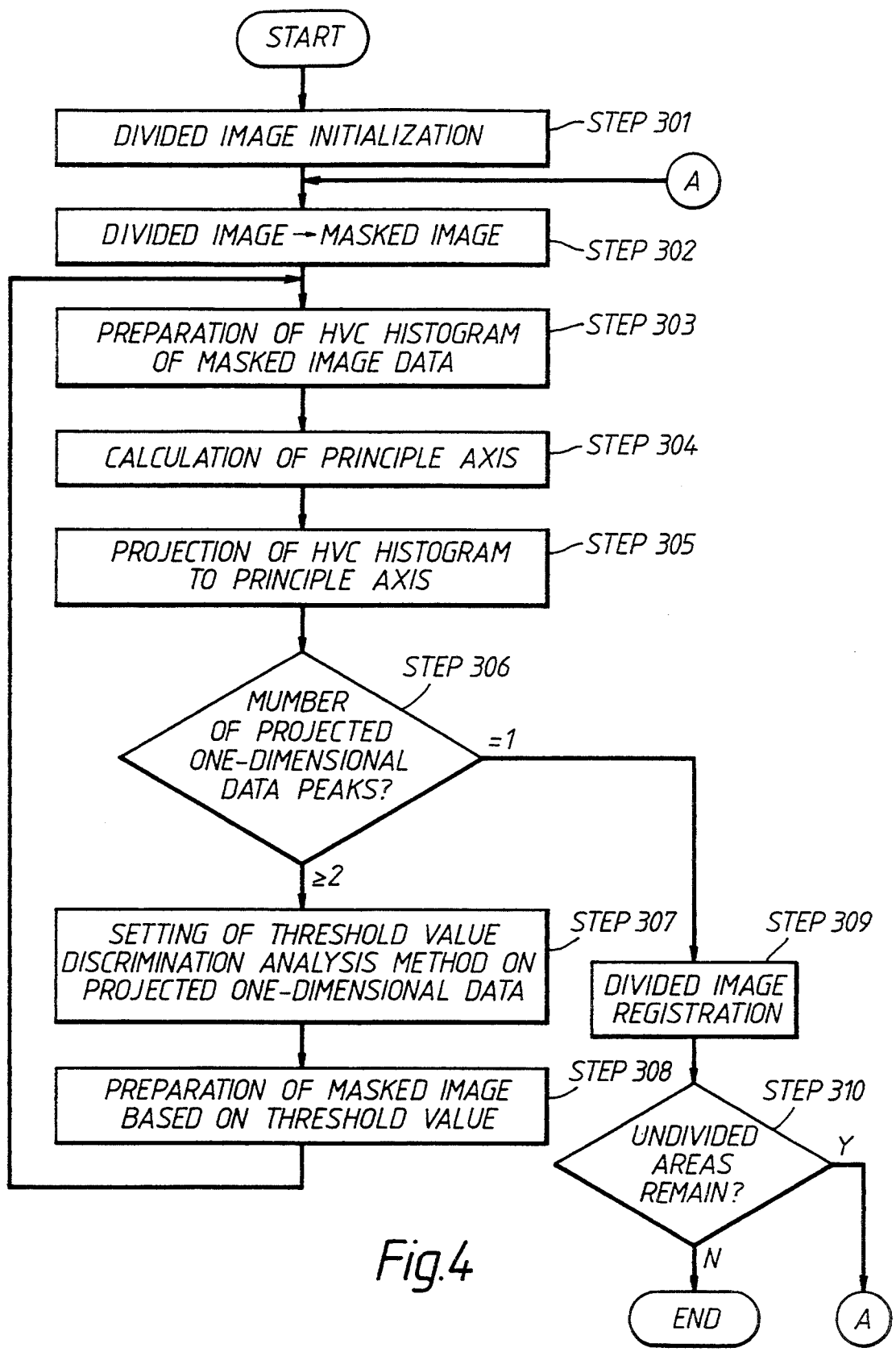
FIG. 4 is a flowchart showing the details of the color image dividing step in the flowchart shown in FIG. 2 as a first embodiment of the present invention.

This color image dividing process is executed according to the process procedures shown in FIG. 4. First, the initialization is executed by making all image areas zero (0), in which the result of division is stored (Step 301). The image resulted from this division is copied on a mask image area (Step 302).

Figure 5:
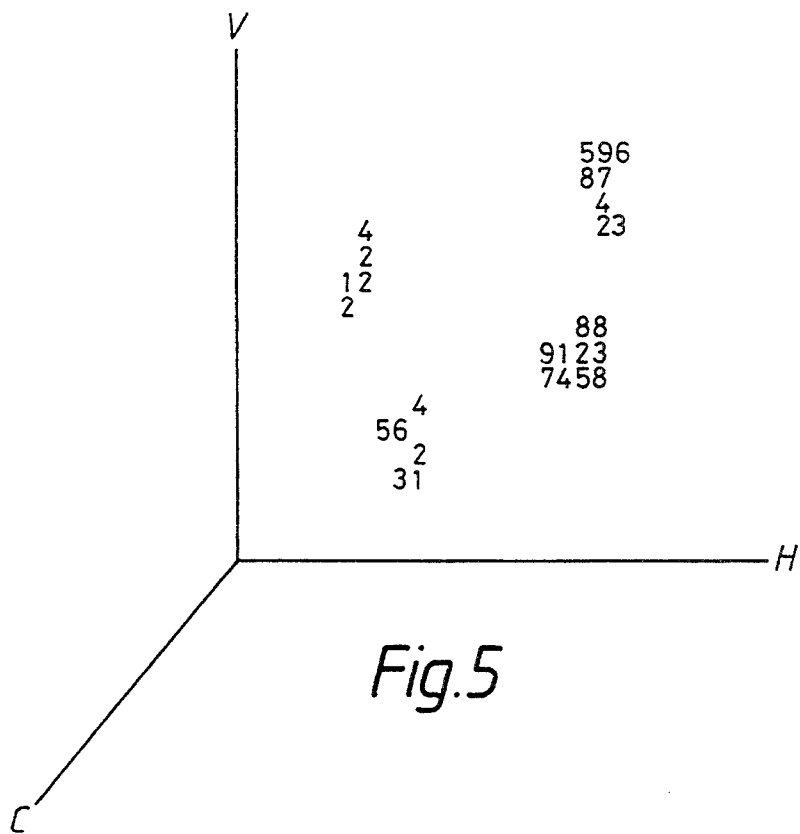
FIG. 5 is a diagram showing an HVC histogram as numerical values arranged in a three-dimensional space.
Figure 6:
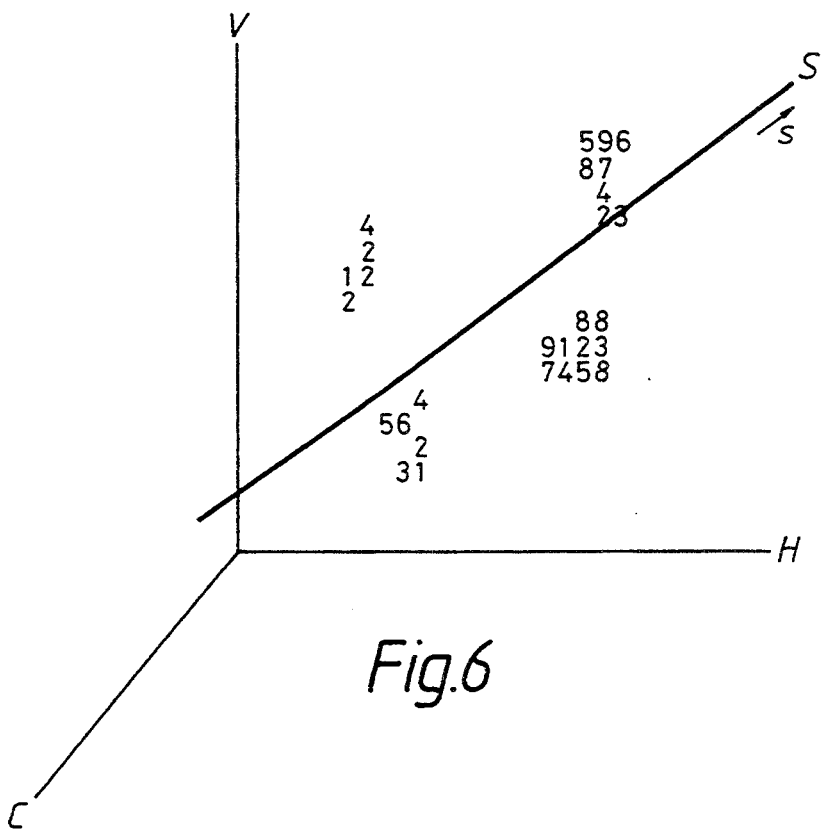
FIG. 6 is a diagram for explaining the process to obtain a principal axis showing the direction in which the variance of the HVC histogram shown in FIG. 5 becomes maximum.

In succession, unmasked image, that is, HVC values of an image which takes zero (0) value in the masked image is checked and the HVC histogram is prepared in Step 303. This histogram can be expressed an numerical values put in a three-dimensional space as shown in FIG. 5. Then, by analyzing principal components of this three dimensional distribution, a principal axis is obtained (Step 304). This is a process to obtain the direction for making the variance maximum and if, for instance, the principal axis is obtained for the histogram shown in FIG. 5, the axis S which is expressed by the directional vector s shown in FIG. 6 is obtained.

Figure 7:
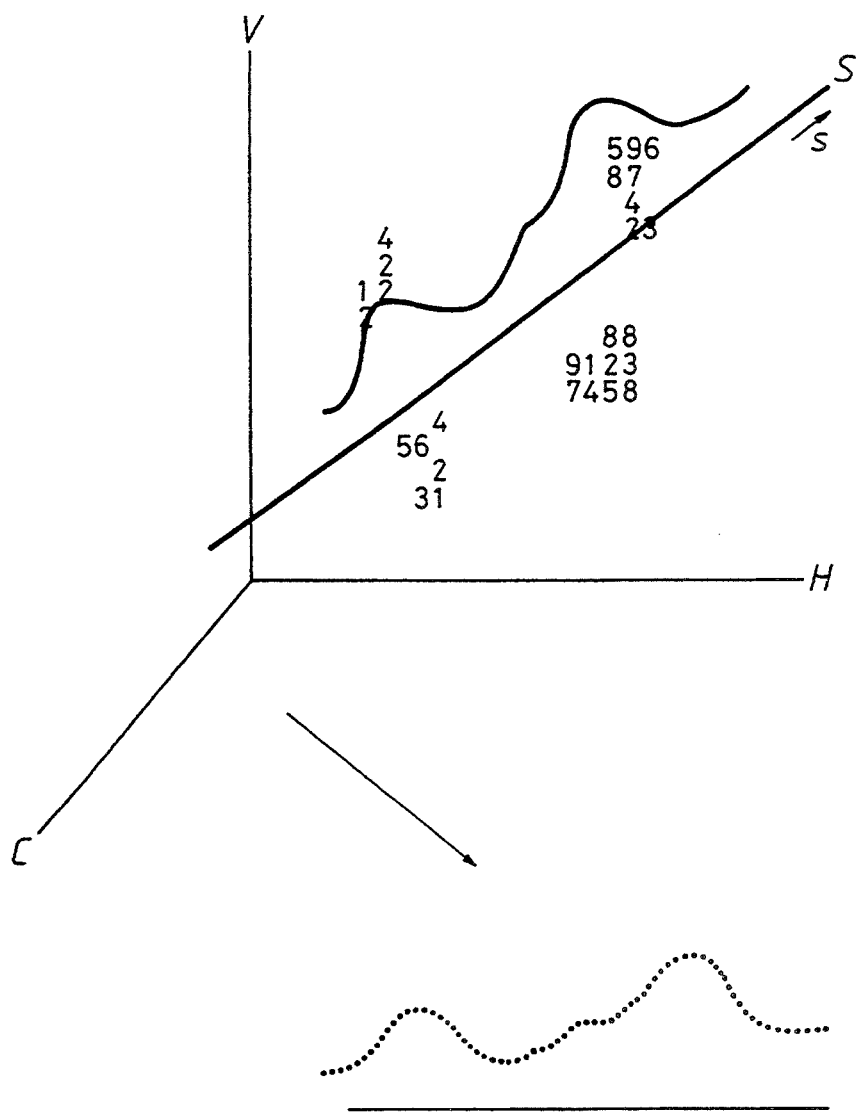
FIG. 7 is a diagram showing the distribution of one-dimensional data which is obtained by projecting to the principal axis of the HVC histogram shown in FIG. 6.

Then, in Step 305, the projection to the principal axis S of the HVC histgram is executed. This will become the one-dimensional data shown in FIG. 7. If there exists only one peak of the distribution in this one-dimensional data (Step 306:=1), the entire image for this distribution is registered as one area in the result of division (Step 309). Thereafter, if there are undivided areas (Step 10: YES), the process is executed repeatedly from Step 302.

Figure 8:
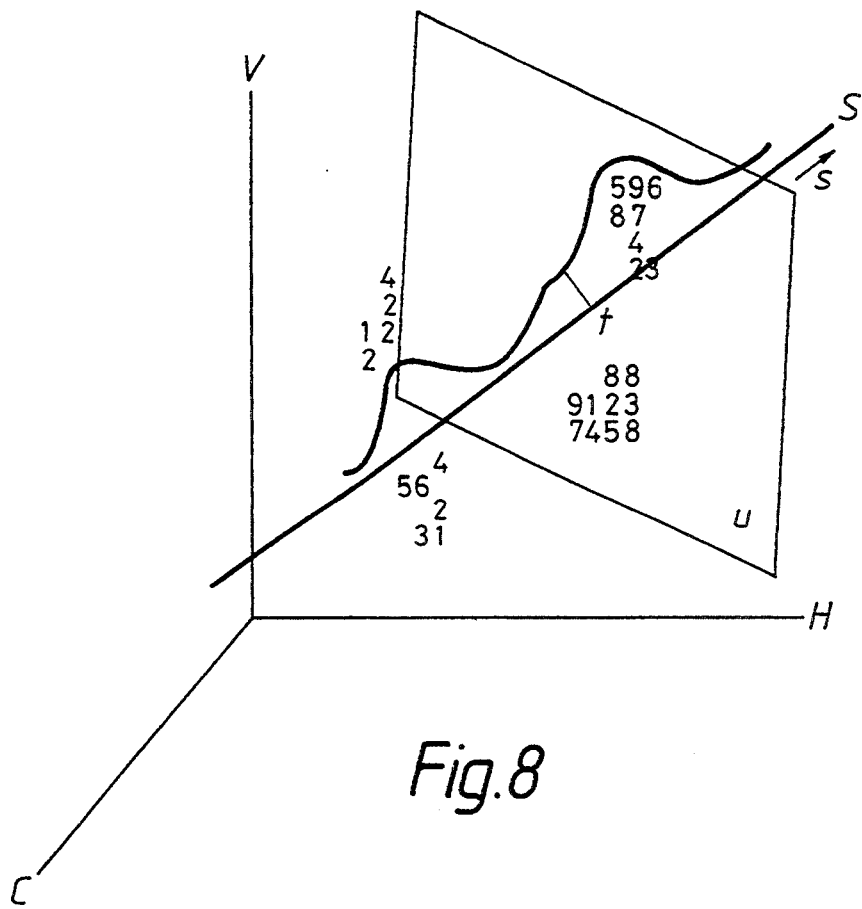
FIG. 8 is a threshold plane showing the distribution of one-dimensional data shown in FIG. 7.

When it is judged that the one-dimensional data projected in Step 306 are composed of plural distributions (Step 306:≧2), a threshold t is decided using a threshold decision method based on the discriminant analysis (Step 307). Pixels corresponding to either one of the distributions are registered as a mask image based on the threshold plane U as shown in FIG. 8 in the three-dimensional distribution according to the principal axis S and a threshold value t on the principal axis S (Step 308).

Thereafter, the process is executed repeatedly for unmasked images from the step for preparing a HVC histgram (Step 303).

Figure 9:
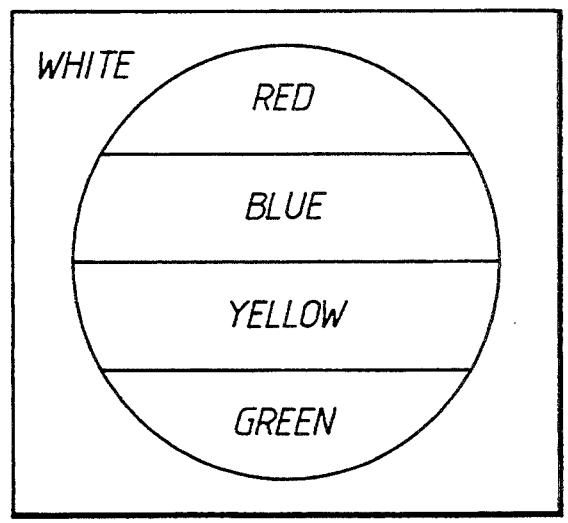
FIG. 9 is a diagram showing a color image before processed by the pattern extracting apparatus of the present invention.
Figure 10:
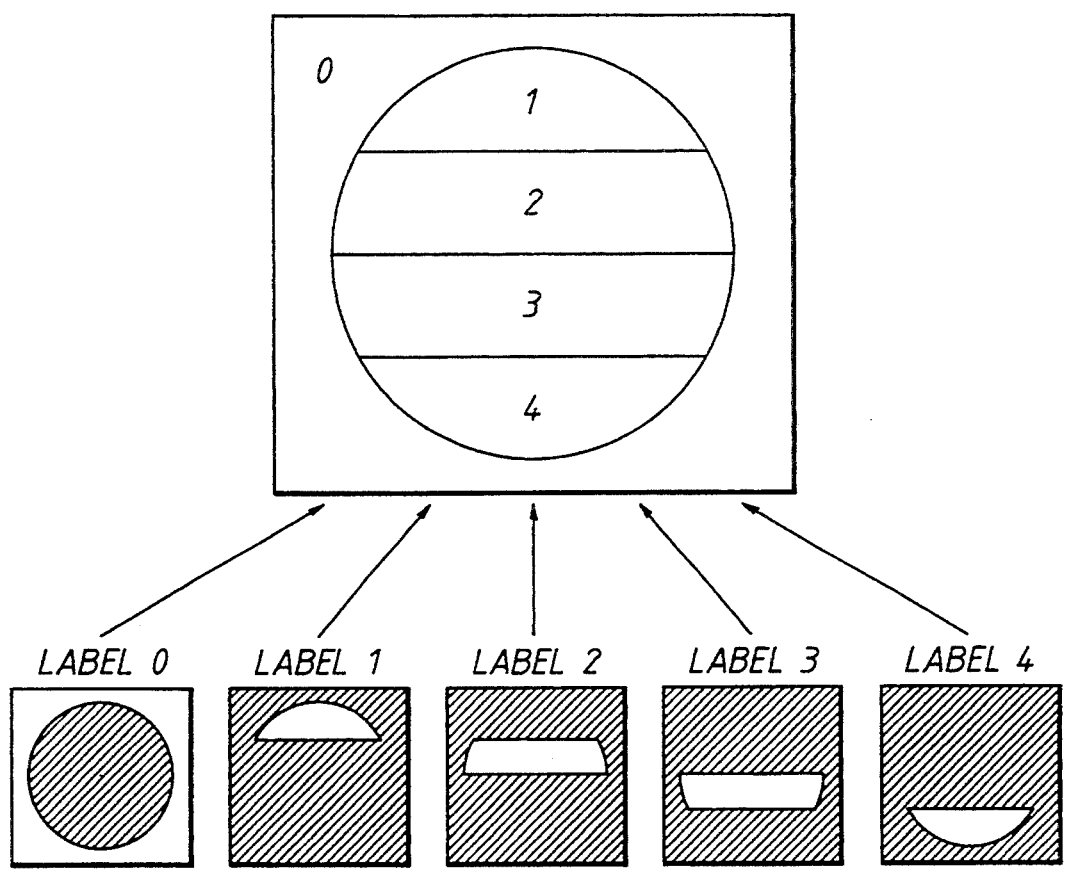
FIG. 10 is a diagram showing the color image illustrated in FIG. 9 after processed by the pattern extracting apparatus of the present invention.

Thus, the process is repeatedly executed in Step 310 until undivided area does no longer exist. When the color image dividing process step S12 is completed, the color images in the construction, for instance, as shown in FIG. 9 will represent a set of binary images with a division label attached as shown in FIG. 10.

The color image dividing process will be completed when the binary images resulting from the area extraction are output from the data output circuit 13 in the Step S13.

As described above, the pattern extracting apparatus in the first embodiment converts data relative to color components based on a function which has a parameter corresponding to a test result. That is, as data are converted to a uniform color space with a distance in the space proportional to a color difference, for instance, the Munsell color system, it is possible to extract areas conforming to human sense.

The present invention is not limited to the embodiment described above. Instead, of can be modified without departing from the scope of the present invention.

A modified example will be described hereinafter for the color data conversion step S11 described.

In the color data conversion in Step S11, a distance between two points representing two colors of the RGB color system described with attention paid to physical properties of light is not proportional to a color difference which is sensible to human. Therefore, image information may be converted into psychophysical colors using the sense when a substance is directly viewed with the naked eye as a scale, subject to human visual characteristic. For instance, they can be converted into the Munsell color system which is a uniform color space.

Physical properties of light are generally specified by spectral reflection factors. The conversion of this spectral reflection factor and the Munsell color system is non-linear.

Figure 11:
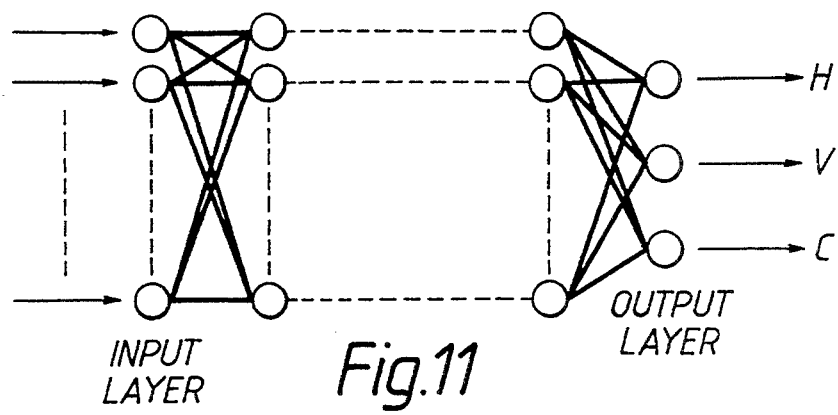
FIG. 11 is a diagram showing the construction of a neural network which is a modified example of the first embodiment of the present invention.

This conversion is executed using the neural network in the tree structure learned according to the error back propagation method. To be concrete, such a neural network as shown in FIG. 11 is designed. The learning is performed by giving the spectral reflection factors specified in the Seventh Edition of the JIS Standard Color Patches as learning data to a tree structure neural network. Output units in the number of color attributes are provided for the output layers of the neural network. That is, according to FIG. 11, when spectral reflection factor data are input in the neural network in the tree structure, orthogonal coordinate values converted from HVC values are output.

Another modified example for the color data conversion step S11 will be described.

In the color data conversion in Step S11, the conversion to regenerate an image in RGB three colors from two Colors of RGB may be executed. Further, a distance between two points representing two colors in the RGB three-dimensional space is not proportional to a color difference sensible to human. Therefore, it may be converted into a uniform color space (the Munsell color system) of which intra-space distance is proportional to a color difference.

Figure 12:
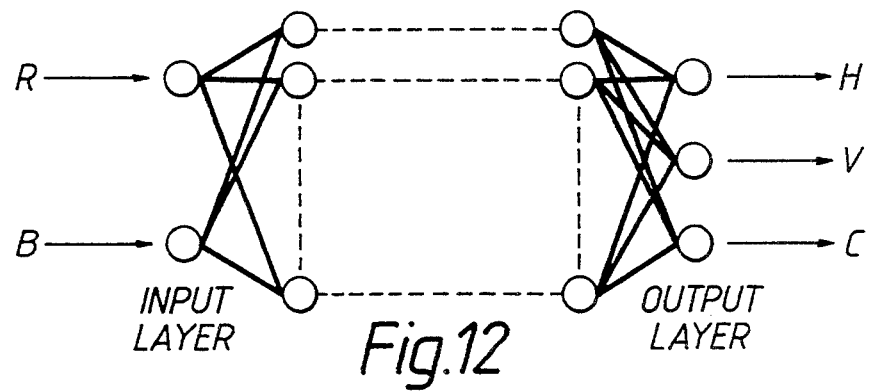
FIG. 12 is a diagram showing the construction of a neural network which is another modified example of the first embodiment of the present invention.

An image in RGB three colors is converted from an image expressed in any two colors of RGB and it is further converted into the Munsell color system according to the conversion table. This conversion is executed using the neural network in the tree structure learned according to the error back propagation method. Such a neural network as shown in FIG. 12 is designed. Two colors out of RGB of the SIDBA (Standard Image Data-Base) image data are given to the neural network in the tree structure for execution of the learning. The output units of the output layer of the neural network are provided in the number of color attributes. That is, when two colors of RGB are input to the tree structure neural network, HVC values converted into the orthogonal coordinate values are output. Standard digital images which are often used in the image processing learning have been collected in the SIDBA.

The color conversion by the neural network is not limited to the conversion method described above, but can be performed according to various modified methods without departing from the scope of the image conversion of the present invention.

As described above, as data relative to color components are converted based on a function having a parameter corresponding to the test result in the embodiment, it becomes possible to extract a pattern which is in accord with human sense.

Figure 13:
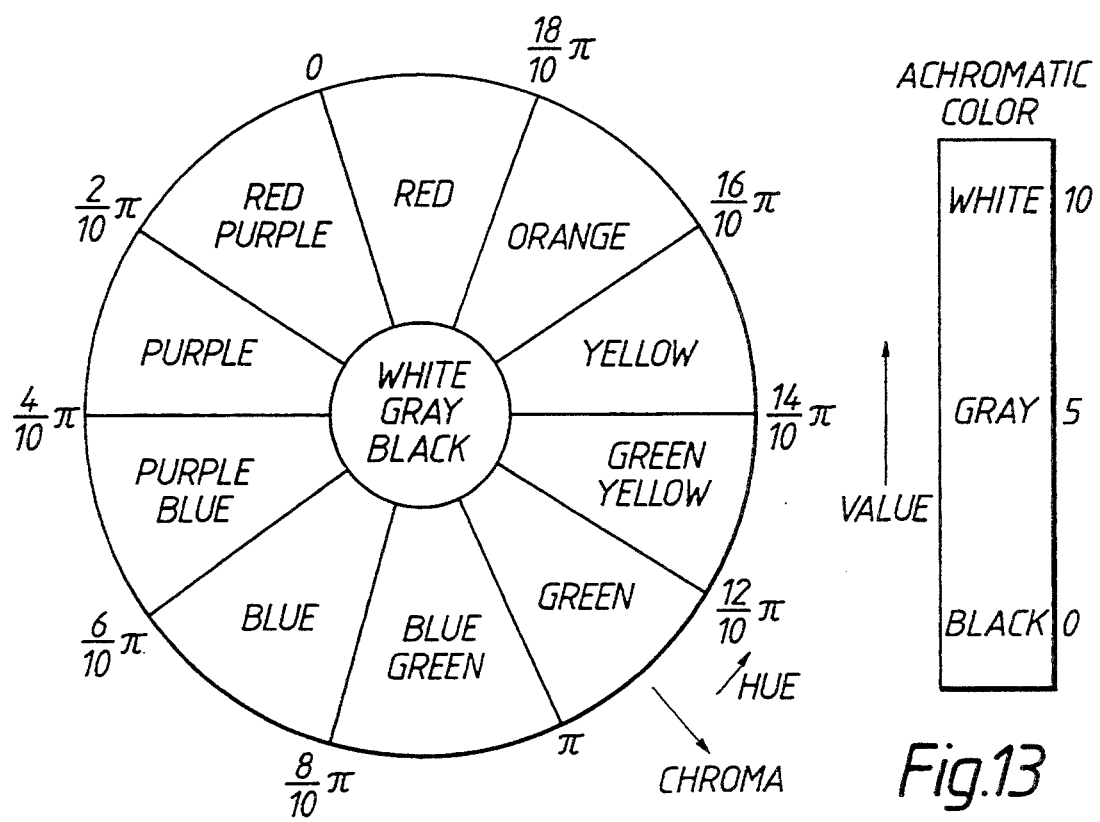
FIG. 13 is a diagram showing the distribution of basic color names in an HVC space, which are used for explaining the details of the color image dividing steps in the flowchart shown in FIG. 2.

Next, the second embodiment is described. In this second embodiment, the color image dividing process in Step S12 is executed as the area dividing process by color names. This area dividing process by color names is achieved by dividing the Munsell HVC space based on, for instance, 13 basic color names specified in the JIS Z-8102 as shown in FIG. 13.

Figure 14:
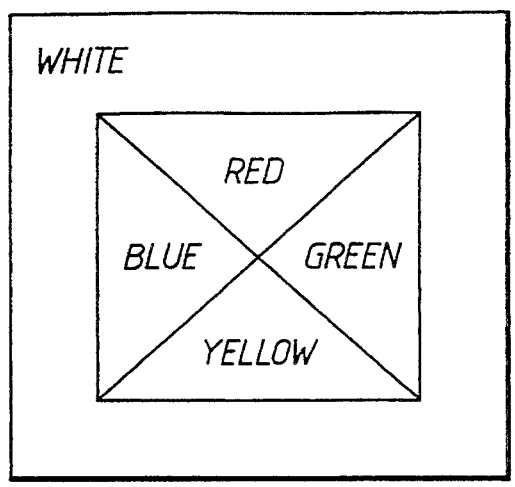
FIG. 14 is a diagram showing a first example of an object to be read in the second embodiment.
Figure 15:
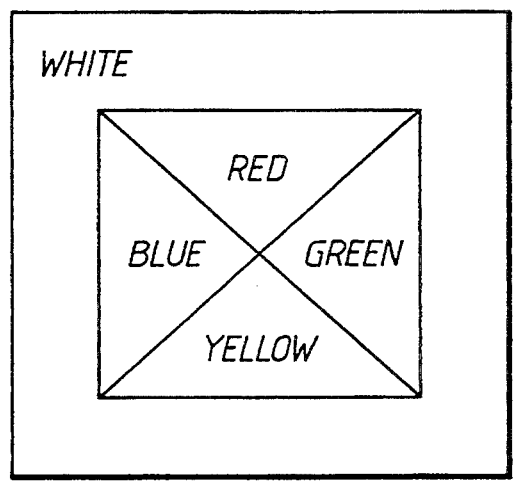
FIG. 15 is a diagram showing an example of extracting an area corresponding to a color name in the first example of an object to be read in the second embodiment.
Figure 15:
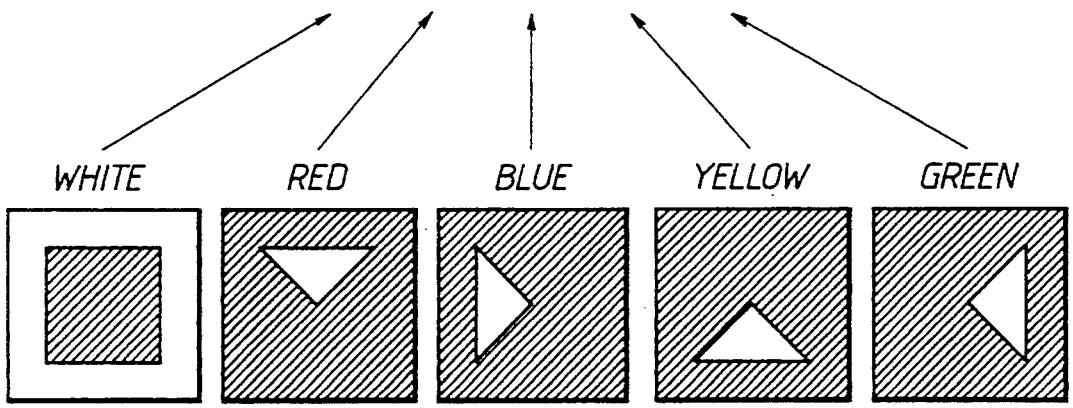

First, colors are classified into chromatic colors and achromatic colors according to chromatic data. Achromatic colors are further classified into three colors according to value data and chromatic colors into ten colors according to hue data. Color labels corresponding to basic color names are assigned to the divided areas, respectively. Further, a set of binary images with "1" substituted for pixels belonging to areas of color labels shown in input images and "0" for other pixels is generated. For instance, a color image in the construction as shown in FIG. 14 will become a set of binary images corresponding to the basic color names as shown in FIG. 15.

This generated set of binary images becomes the result of division. Although it is possible to output all the divided binary images, they are corresponding to respective color names and it is possible to extract only a specific area by specifying a color name.

When the binary images thus obtained by extracting areas are output from the data output circuit 13 in Step S13, the process will be completed.

Figure 16A:
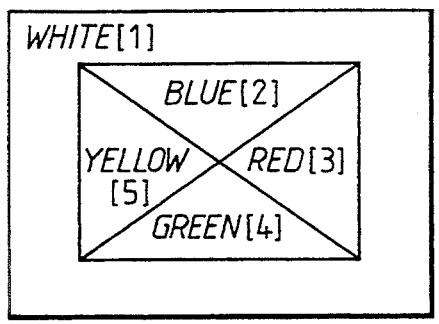
FIG. 16A is a diagram showing an object to be read.

The operation described above will now be described again in more detail with reference to FIG. 16A to 16E. As is shown in FIG. 16A, the object P contains five color patterns, for instance, White [1], Blue [2], Red [3], Green [4] and Yellow [5] are mixtured. The object P passes through the color line sensor 2, color image data on the object P are photoelectrically converted into signals. The photoelectrically converted signals are sent to A/D converter 3. The A/D converter 3 converts the photoelectrically converted signals received from the color line sensor 2 into RGB digital image data. The converted RGB color image data are stored in the frame memories 4, 5 and 6, respectively under the control by the memory controller 7.

Figure 16B:
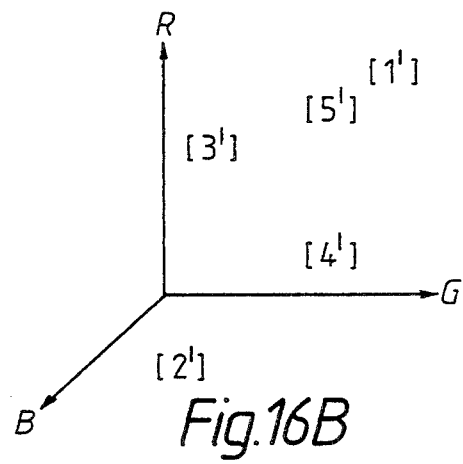
FIG. 16B is a diagram showing an RGB three-dimensional space.

The CPU 10 converts the color image data stored in the frame memories 4, 5 and 6 into color data which are three attributes of color perception. That is, as shown in FIG. 16B, the each of color data [1'] to [5'] corresponding to each of the colors [1] to [5] are arranged in the RGB three-dimensional space.

Figure 16D:
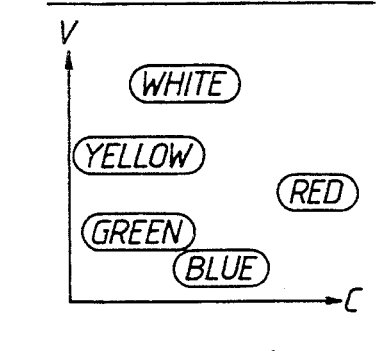
FIG. 16D is a diagram showing an HVC space in Munsell color system.
Figure 16C:
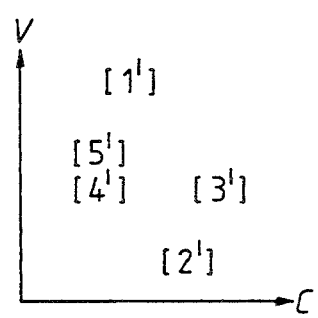
FIG. 16C is a diagram showing an HVC space arranged color data.
Figure 16E:
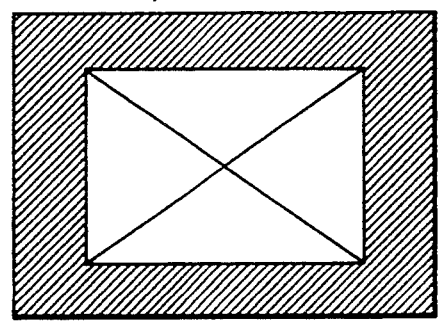
FIG. 16E is a diagram showing a memory stored color data.

Then, the color data [1'] to [5'] arranged in the RGB three-dimensional space are converted into color data [1''] to [5''] which are arranged in the HVC space, as shown in FIG. 16C. This conversion is accomplished by converting the RGB values into xyY values according to the expression (1) and obtaining the HVC values from xyY values according to the convertion table (FIG. 27). The neural network is used for this conversion, as described above. The color data corresponding to the of colors in the Munsell color system are previously prepared (for instance, as shown partially in FIGS. 13, 17, 19 and 20), as the color data arranged in the HVC space. FIG. 16D shows the HVC space in which only five colors white, blue, red, green and yellow are arranged. The color data [1''] to [5''] arranged in the HVC space are compared with the color data arranged in the HVC space in Munsell color system shown in FIG. 16D, respectively. By this comparison, the color data [1''] is recognized as "White", [2''] is "Blue", [3''] is "Red", [4''] is "Green" and [5''] is "Yellow", respectively. When the operator designates "White" as a color pattern while being extracted from the object P in the working memory 12 which is previously initialized by storing all "0" data, data "1" is stored in the area working memory 12 corresponding to the color pattern White [1], as shown in FIG. 16A and Data "0" is stored in the other area corresponding to the color patterns Blue [2], Red [3], Green [4] and Yellow [5]. Therefore, the area stored data "1" shown by a hatching in FIG. 16E are output from output circuit 13 as "White" color. Likewise, another colors Blue [2], Red [3], Green [4] and Yellow [5] can be output from output circuit 13, respectively.

A modified example of the area dividing process by color names in Step S12 will be described. As partially shown in FIG. 17, the area dividing process by color names in Step S12 is achieved by dividing the Munsell HVC space according to system color names specified in, for instance, the JIS Z-8102.

Figure 18:
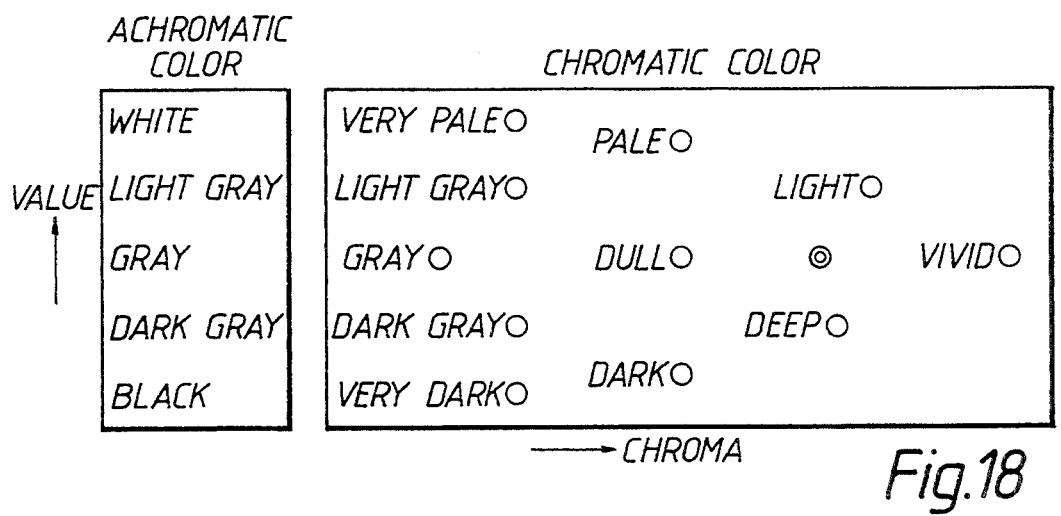
FIG. 18 is a diagram showing the correlation among modifiers of value of achromatic colors, value and chroma of chromatic colors which are used for explaining a modified example of the second embodiment.

First, similar to the area dividing process by color names described above, a color space is divided into 13 basic color names. These 13 basic color names are further subdivided using modifiers. To be concrete, value and chroma of chromatic colors and value of achromatic colors are further subdivided using modifiers which are shown in FIG. 18, and hue is subdivided using modifiers shown in FIG. 19. The divided areas are assigned with color labels corresponding to system color names, respectively. Further, similar to the division process according to color names described above, a set of binary images is generated with "1" substituted for pixels belonging to areas with color labels shown in input images and "0" for other pixels is generated.

Similar to the division process by color names described above, this generated set of binary images becomes the result of division. Although it is possible to output all the divided binary images, they are corresponding to respective color names and it is possible to extract only a specific area by specifying a color name. Further, it may be difficult to specify a color name as there are too many system color names. So, in this case it is made possible to specify a specific color by displaying all color names and representative colors included in an object to be read.

When the binary images thus obtained by extracting areas are output from the data output circuit 13 in Step S13, the process will be completed.

Further, another example of the modification of the area dividing process according to color names in this Step S12 will be described. The area dividing process by color names in Step S12 is achieved by dividing the Munsell HVC space according to idiomatic color names specified in the JIS Z-8102 as partially shown in FIG. 20.

Figure 20:
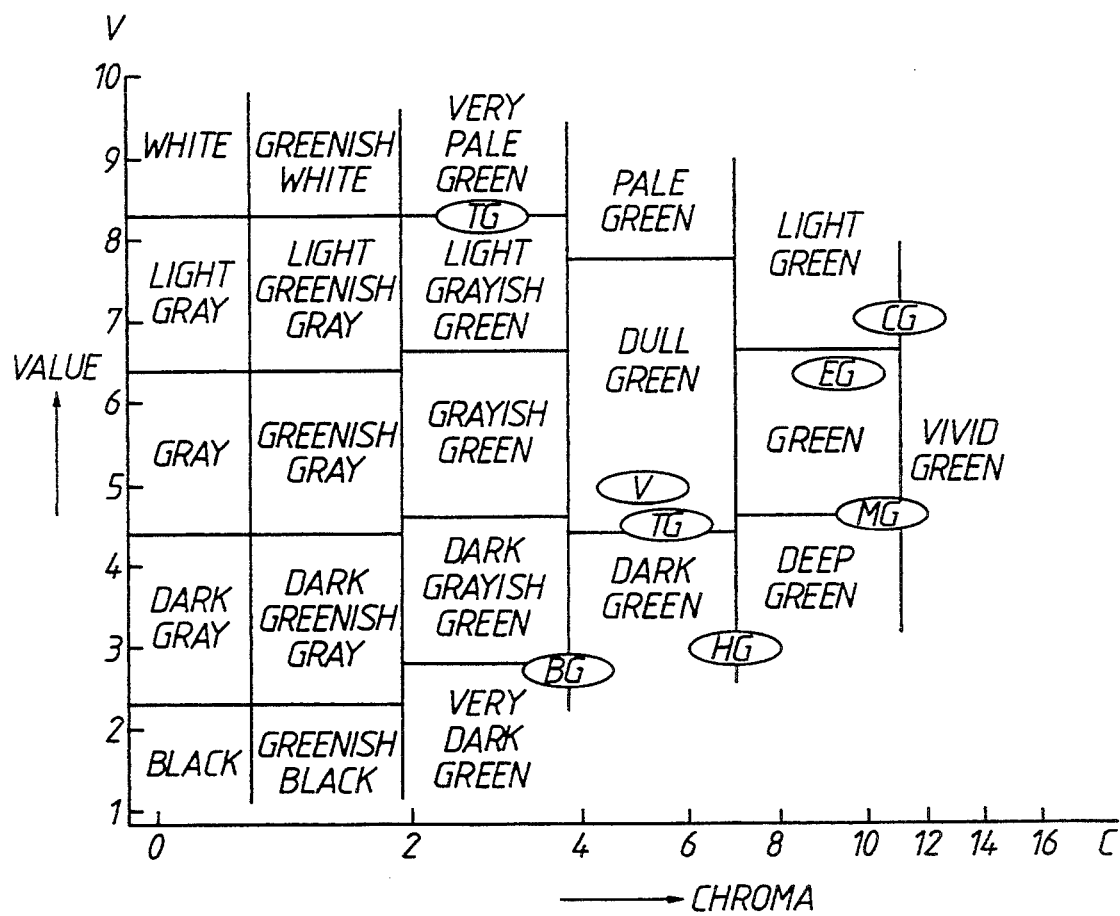
FIG. 20 is a diagram showing some of conventional color names in the HVC space, which are used for explaining another modified example of the second embodiment.
Figure 21:
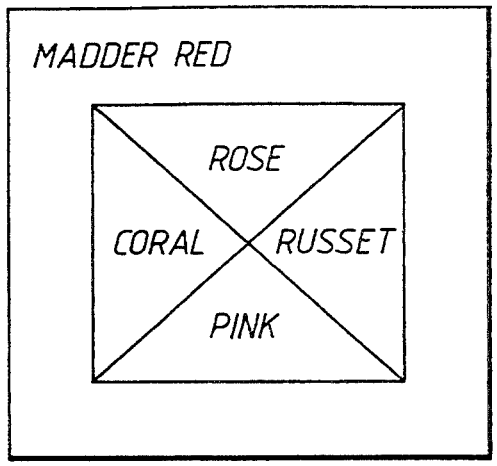
FIG. 21 is a diagram showing the second example of an object to be read which is used in another example of the second embodiment.
Figure 22:
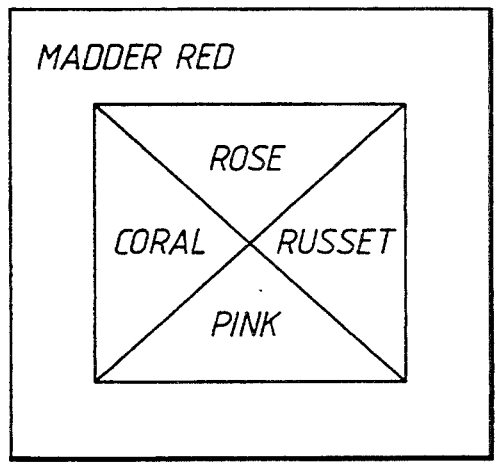
FIG. 22 is a diagram showing an example of extracting areas corresponding to color names in the second example of an object shown in FIG. 21.
Figure 22:
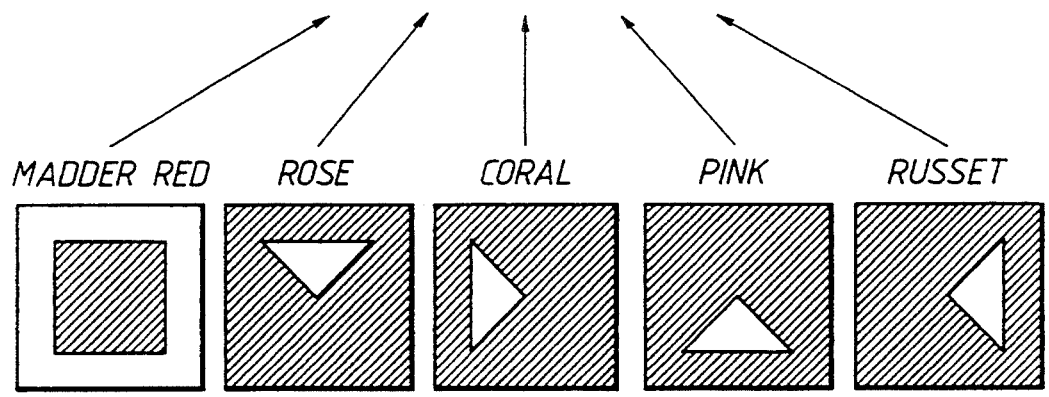

First, with three attributes of representative colors corresponding to idiomatic color names registered in advance, color labels of idiomatic color names of which have color differences with input HVC values are assigned. Further, similar to the dividing process using color names described above, a set of binary images is generated with "1" substituted for pixels belonging to areas shown on color labels in the input images and "0" for other pixels. For instance, color images in the construction as shown in FIG. 20 will become a set of binary images corresponding to idiomatic color names as shown in FIG. 21.

This area dividing process according to idiomatic color names makes it possible to perform the division by colors that are often used. Further, it is also possible to subdivide a color space with modifiers in the area dividing process using idiomatic color names similar to the area dividing process using system color names.

Similar to the dividing process according to color names described above, this generated set of binary images will become the result of division. Although it is possible to output all the divided binary images, they are corresponding to respective color names and it is possible to extract only a specific area by specifying a color name. Further, there are many idiomatic color names similar to system color names, and if colors are the same system colors but differences among them are sensible to human as shown in FIG. 21, it may be difficult to specify a color name. So, in this case it is made possible to specify a specific color by displaying all of color names and their representative colors included in an object to be read.

When the binary images thus obtained by extracting areas are output from the data output circuit 13 in Step S13, the process will be completed.

Further, this area dividing process according to color names is not limited to the dividing process described above. Instead it is possible to apply it in various modified ways without departing from the true scope of the area dividing process according to color names.

Next, the third embodiment of the present invention will be described. The construction of the apparatus in the third embodiment is the same as that in the first embodiment shown in FIG. 1 but the process procedures of the CPU 10 differ from those in the first and the second embodiments.

Figure 23:
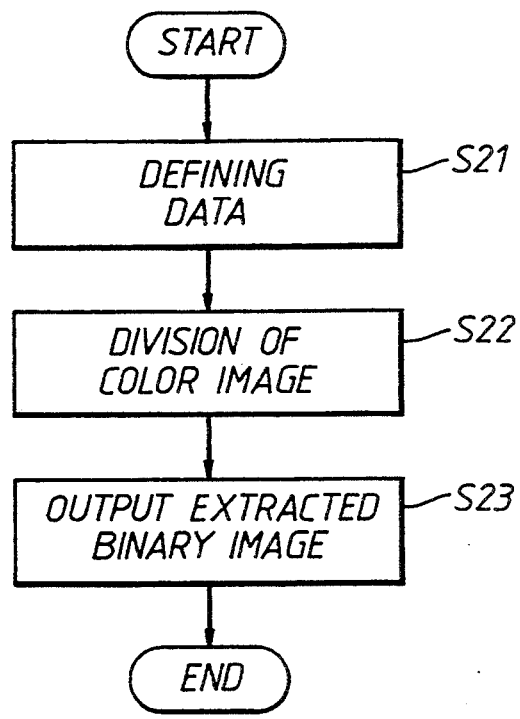
FIG. 23 is a flowchart shown for explaining the process procedures to extract patterns in the third embodiment.

That is, a program for executing the process shown in the flowchart in FIG. 23 has been stored in the program memory 11. The CPU 10 executes the process according to this program. First, the CPU 10 defines an RGB space by a color name (S21), then extracts a specific area by dividing the area using a color name on the RGB space (S22), and then it outputs the extracted binary images (S23).

More specifically, first in the process in Step S21, the RGB space formed by RGB components of the NTSC system, which is an output from the color image input device 1, is defined based on the JIS standard color table which are generally used extensively. In this case, as the JIS Standard Color Patches have been standardized by the Munsell color system, it is necessary to convert HVC values of the Munsell color system into RGB values of the NTSC system.

On the other hand, the conversion table to HVC values of the Munsell color system, which is clarified in the JIS standard, corresponds to the chromaticity coordinates x, y and luminous reflectance Y as described above. It is well known that this xyY values can be converted into RGB values of the NTSC system according to Expression (1).

Therefore, the following two kinds of methods can be considered for the correspondence of RGB values of the NTSC system with HVC values of the Munsell color system. That is, one method is to convert HVC values of the Munsell color system into xyY values according to the conversion table and then, convert this xyY values into RGB values according to Expression (1), and the other method is to use the conversion table by rewriting it into the corresponding table of RGB values of the NTSC system with HVC values of the Munsell color system.

In both methods, it is not possible to make the conversion accurately according to the expression instead of the conversion table. So, in this embodiment this conversion process is achieved using the neural network. In order to achieve the conversion process, this neural network is composed of three input units corresponding to HVC values of the Munsell color system and three output units corresponding to RGB values of the NTSC system.

Figure 24:
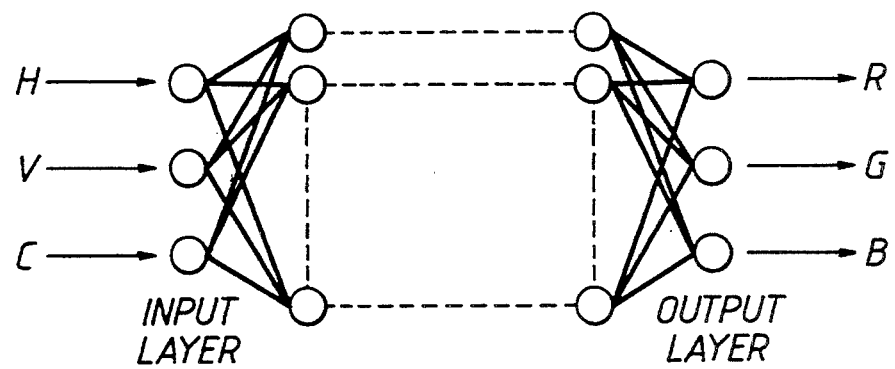
FIG. 24 is a construction diagram of a neural network which realizes the conversion of HVC values into RGB values in the third embodiment.

The neural network in the tree structure, for instance, as shown in FIG. 24 is learned according to the error back propagation method. The learning is so performed that output values of the neural network will approach the RGB values of the NTSC system, which are converted from corresponding xyY values according to Expression (1) against HVC values and which are input to the neural network based on the correspondence between known xyY values and HVC values of the Munsell color system on the conversion table. And, if preset conditions are satisfied, the learning will be completed.

Using the learning completed neural network, it is possible to convert HVC values of the Munsell color system on the JIS Standard Color Patches into RGB values.

Next, the area dividing process by color names is executed in Step S22. The RGB space is specified by color names by mapping, for instance, 13 basic colors in the RGB space in the data defining process in Step S21.

Then, this RGB space is divided by color names. The divided areas are assigned with color labels corresponding to respective basic color names. Further, a set of binary images is generated with "1" substituted for pixels belonging to color label areas shown in input images and "0" for other pixels.

Further, this data defining process is not limited to the basic color names shown in this embodiment, and similar to the second embodiment described above, even when system color names, idiomatic color names or a combination of them are used, the scope of the present invention remains unchanged.

The set of binary images generated will become the result of division similar to the second embodiment described above. Although it is possible to output all of the divided binary images, they are corresponding to respective color names and it is possible to extract only a specific area by designating a color name.

When the binary images thus obtained by extracting areas are output from the data output circuit 13 in Step S23, the process will be completed.

As described in the third embodiment, the pattern extracting apparatus of the present invention is capable of obtaining a result of division which is in accord with human judgment. It obtains such a result by dividing the area into accurate color names based on the Munsell color system corresponding to mapped human perceptive characteristic. This is contrary to the area division according to a set of binary images represented by color names based on a conventional RGB color space or a color space approximating human perceptive characteristic converted from the conventional RGB color values or a space approximated to that color space. Accordingly, it becomes possible to extract a specific area from multicolored images precisely.

Figure 25:
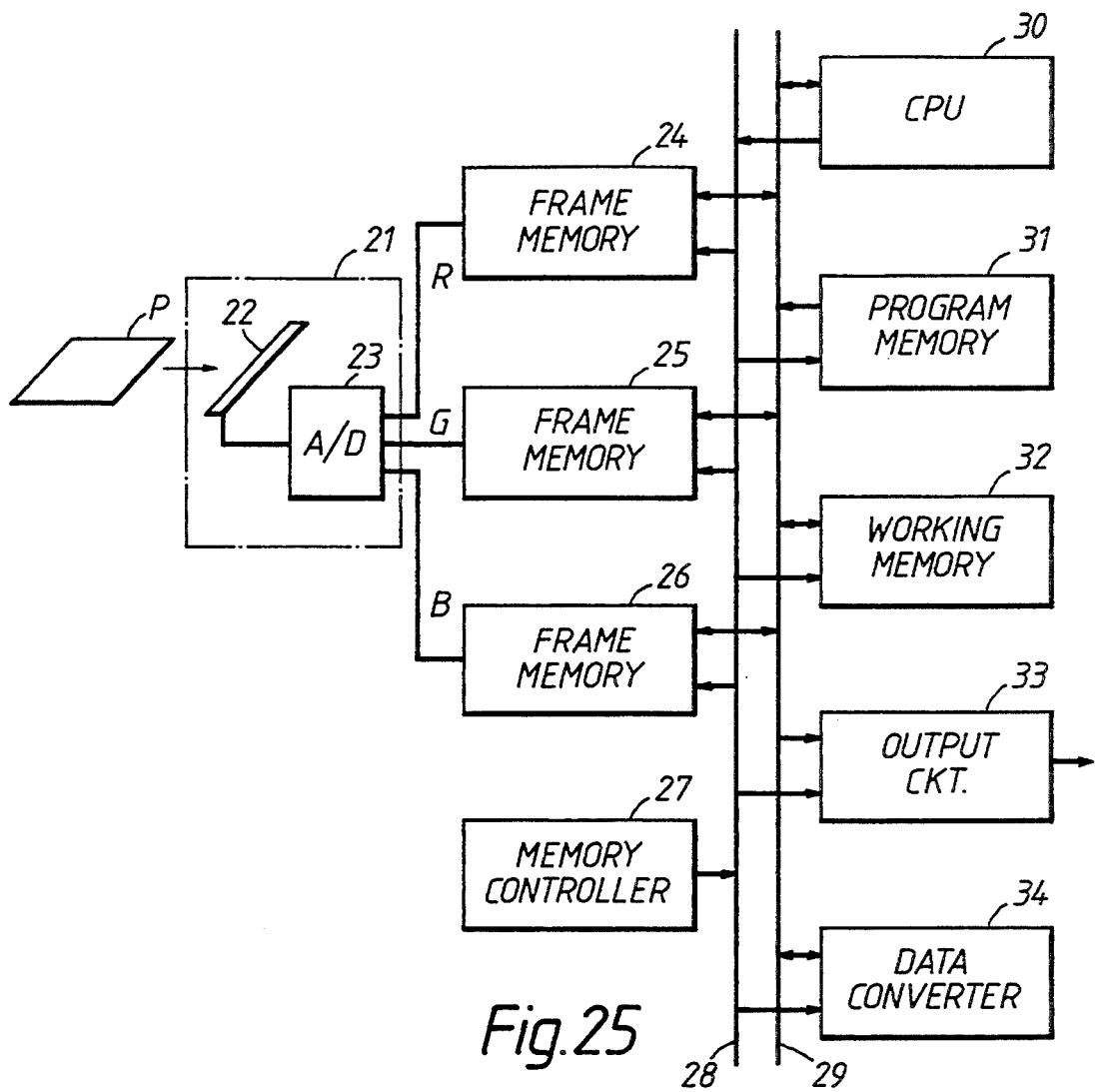
FIG. 25 is a block diagram showing the construction of the fourth embodiment with the pattern extracting apparatus of the present invention applied to a colorimetric apparatus.

Next, the fourth embodiment of the present invention with the pattern extracting apparatus of the present invention applied to a colorimetric apparatus will be described. FIG. 25 shows the construction of the colorimetric apparatus involved in this fourth embodiment. In FIG. 25, P denotes a colorimetric object, for instance, a full colored document containing multicolored images, and is to be transported in the direction of arrow as shown. When the colorimetric object P being transported passes through a color image input device 21, which is an information collecting means, three color information of R (Red), G (Green) and B (Blue) of the entire surface are read and input as RGB values in accordance with the NTSC system.

In the color image input device 21, a color line sensor 22 executes the photoelectric conversion by optically scanning the colorimetric object P in the direction perpendicular to the transporting direction and sends its photoelectrically convered signals to the A/D converter 23. The A/D converter 23 converts the input photoelectric conversion signals into RGB digital signals and outputs them as RGB digital image data, respectively.

RGB image data which are output from the color image input device 21 are stored in frame memories 24, 25 and 26, respectively. The frame memories 24, 25 and 26 are controlled by a memory controller 27, respectively and are connected to a CPU 30, which performs the entire control, through an address bus 28 and a data bus 29.

The CPU 30 is connected with a program memory (ROM) 31 which stores a control program, a working memory (RAM) 32, a data output circuit 33 which outputs data to the outside, and a data converter 34 which converts input RGB values into HVC values of the Munsell color system using the neural network through the address bus 28 and the data bus 29.

The HVC values represent hue (H), value (V) and chroma (C), which are three attributes of the Munsell color system quantified human perception. "Hue" defines a difference among such colors as red, blue and yellow, "Value" defines a scale of color brightness and "Chroma" defines a scale to indicate definition of color.

The processing operation of the pattern extracting apparatus in the construction as described above will be described. When the colorimetric object P is transported in the arrow direction as shown and passed through the color line sensor 22, the color information on the colorimetric object P are photoelectrically converted into signals by the color line sensor 22 and the photoelectrically converted signals are sent to the A/D converter 23. The A/D converter 23 converts the photoelectrically converted signals from the color line sensor 22 into RGB digital image data. This converted RGB color image data are stored in the frame memories 24, 25 and 26, respectively under the control of the memory controller 27.

When the storage of image information into the frame memories 24, 25 and 26 is completed, the control of the frame memories 24, 25 and 26 is turned over to the CPU 30. Thereafter, the CPU 30 executes the processes described below according to the processing program stored in the program memory 31.

First, the RGB color image data stored in the frame memories 24, 25 and 26 are converted into HVC values of the Munsell color system by the data converter 34. The data converter 34 is composed of the neural network (FIG. 3) which is constructed at least in three layers of which input and output layers are composed of three neurons, respectively, and converts input RGB values into HVC values of the Munsell color system.

Figure 26:
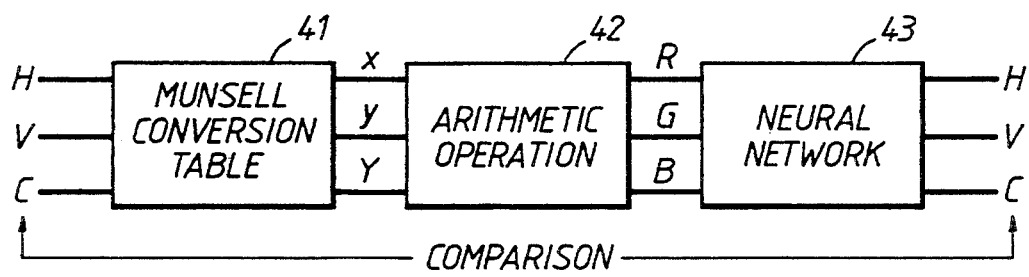
FIG. 26 is a diagram for explaining a study method of the neural network in the fourth embodiment.

The learning method of the neural network is shown in FIG. 26. In FIG. 26, a Munsell conversion table 41 is a correspondence table of Munsell values, xy values (chromaticity coordinate values) and Y values (luminance reflectance) which are defined in the Japanese industrial Standards (JIS) as shown in FIG. 27. For HVC values of one Munsell color system color, RGB values are obtained from corresponding xyY values according to Expression (1) in an arithmetical operation means 42 and used as input values to the neural network 43. The output from the neural network generated corresponding to the RGB values is compared to the original HVC values. The learning of the neural network 43 is conducted by feeding back and minimizing error between them. These procedures are carried out repeatedly for a plurality of data of the Munsell conversion table 41 until the learning is completed.

A different learning method of the neural network is shown in FIG. 28. In FIG. 28, the color data of the Munsell color table 44 having HVC values which are already known are read by a data input means 45. This color data is input to a neural network 46. The learning is carried out in such a manner that the output of the neural network 46 for respective color data of the Munsell color table 44 correspond to the original HVC values. According to such the learning method, it is possible to construct a colorimetric apparatus even if the data input means 45 does not output RGB values of the NTSC system accurately.

With the neural network of which learning was completed as described above incorporated into the data converter 34, RGB values which are input by the color image input device 21 are converted to HVC values and the result of this conversion is output for display by the data output circuit 33.

The fourth embodiment of the present invention as described above can provide a colorimetric apparatus which is capable of measuring HVC values of the Munsell color system, which have quantified human perception, and has a learning function adaptable even to characteristic variations of the color image input device.

Next, the fifth embodiment of the present invention will be described. Though the overall construction of this fifth embodiment is the same that of the fourth embodiment shown in FIG. 25, the process operations are somewhat different. The color image input device 21 reads color image information of a colorimetric object P as two-dimensional color image data and stores them as RGB color image data in the frame memories 24, 25 and 26, respectively.

The RGB color image data stored in the frame memories 24, 25 and 26 are transferred to the data converter 34 under the control of the CPU 30. The data converter 34 converts the RGB values from the frame memories 24, 25 and 26 into HVC values of the Munsell color system through the learning using a neural network similar to the fourth embodiment described above. This converted image data are the two-dimensional color image data of which every pixel has HVC values of the Munsell color system. So, HVC values of the Munsell color system which could be measured so far for every point but now can be measured at one time for the entire image.

The two-dimensional color image data thus converted into HVC values are output for display by the data output circuit 33.

The fifth embodiment of the present invention described above can provide a colorimetric apparatus which is capable of performing the colorimetry as two-dimensional image data having HVC values of the Munsell color system, which represents the quantified human perception.

Figure 29:
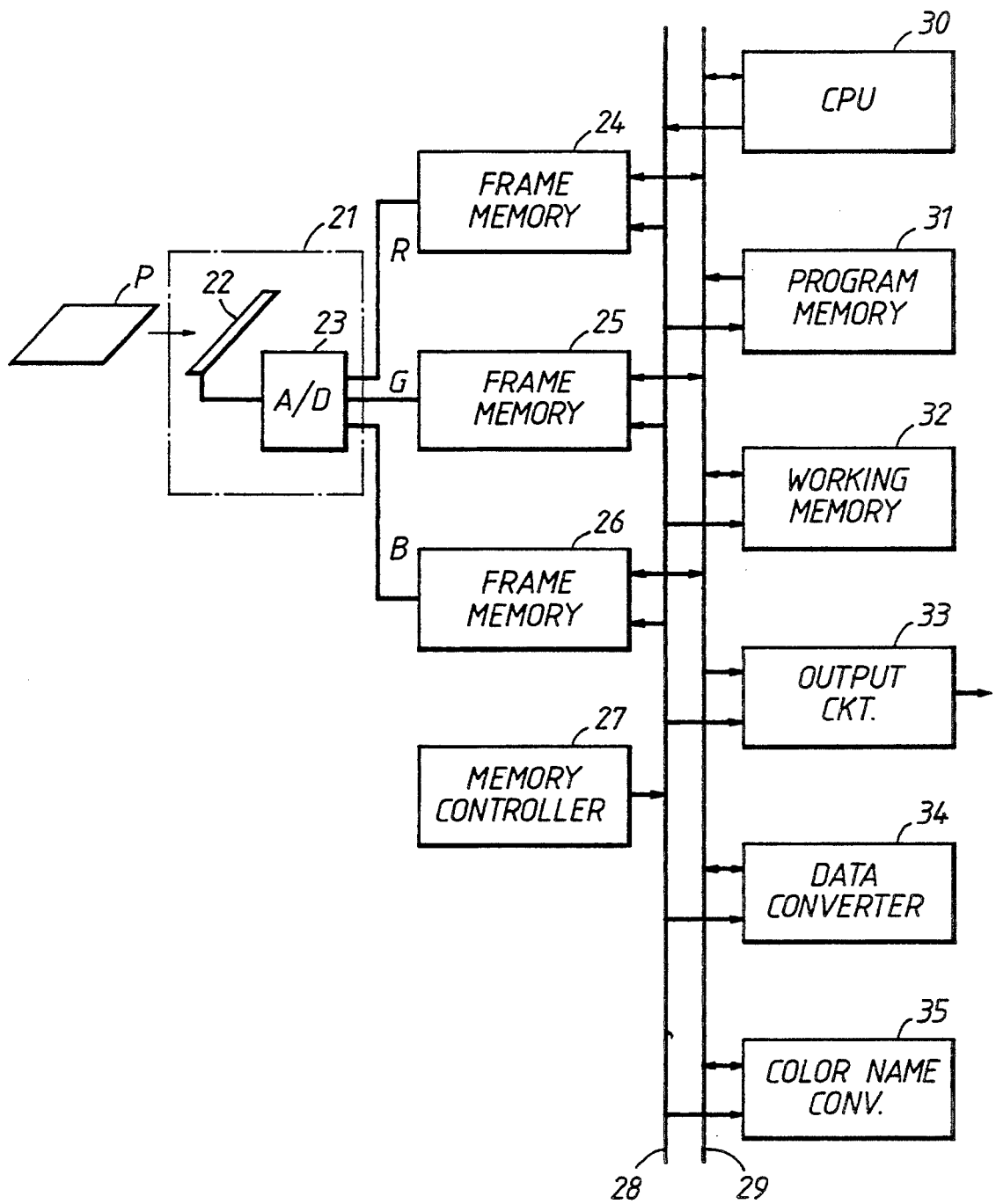
FIG. 29 is a block diagram showing the construction of the sixth embodiment of the present invention.

FIG. 29 is a block diagram showing the construction of the colorimetric apparatus involved in the sixth embodiment of the present invention. In this embodiment, a color name converter 35 is connected to the CPU 30 through the address bus 28 and the data bus 29 as compared with the fifth embodiment shown in FIG. 25, and the process operation will be described hereinafter.

Similar to the fourth embodiment, the color image input device 21 reads color image information of the colorimetric object P, inputs them as RGB color image data and converts them into HVC values of the Munsell color system by the data converter 34. In succession, the HVC values of the Munsell color system which are output from the data converter 34 are transferred to the color name converter 35 under the control by the CPU 30. The color name converter 35 converts the HVC values from the data converter 34 into a color name character string and outputs it. The color name converter 35 is a data base containing the known correspondence of the HVC values of the Munsell color system with color names shown in the examples in FIGS. 13 to 15 and 17 to 20.

Figure 17:
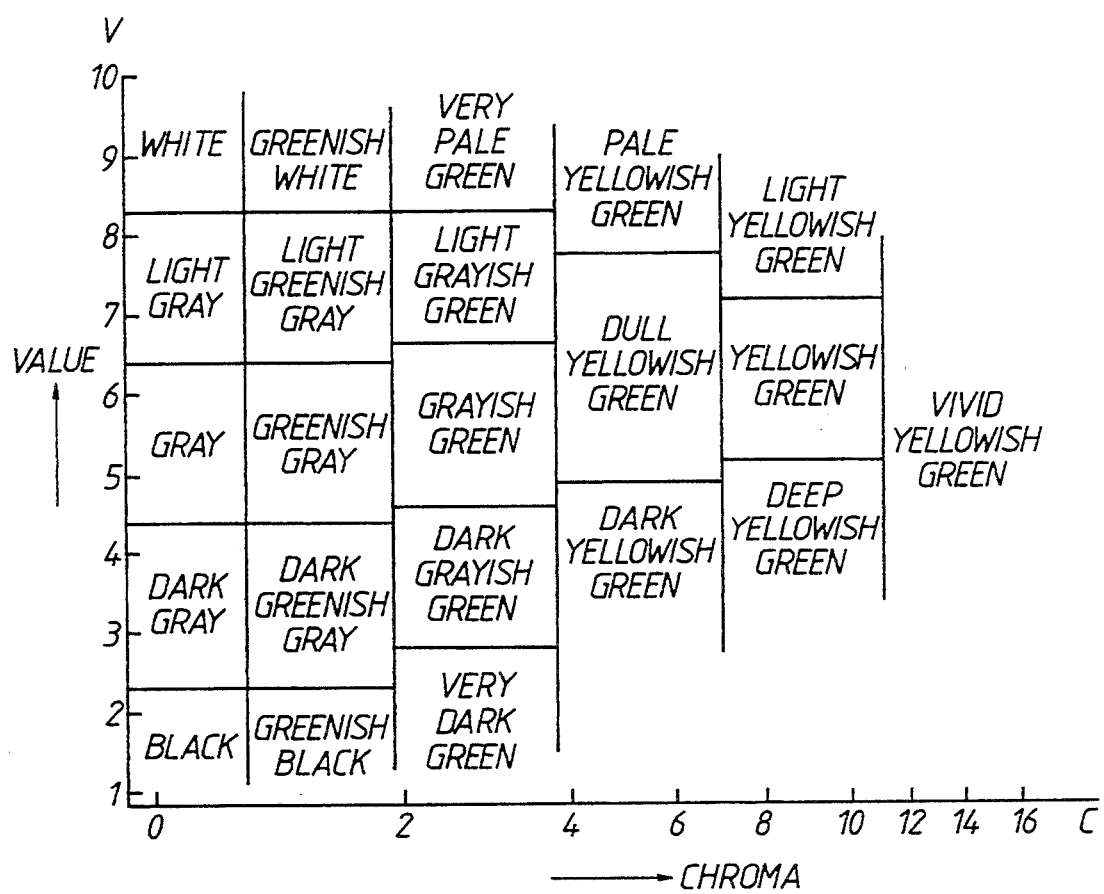
FIG. 17 is a diagram showing some of system color names in the HVC space, which is used for explaining a modified example of the second embodiment.
Figure 19:
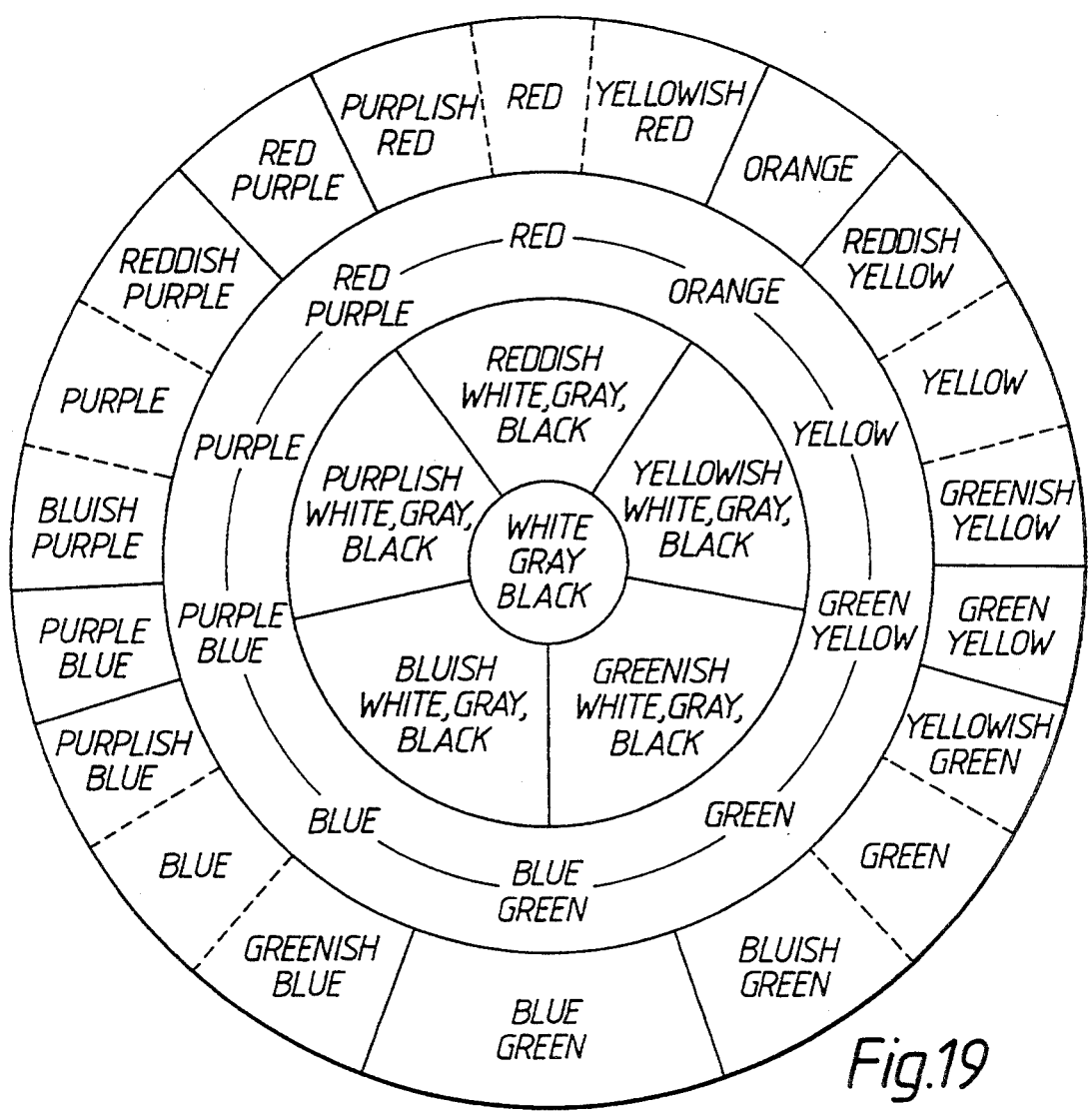
FIG. 19 is a diagram showing the correlation of modifiers relative to hue which are used for explaining a modified example of the second embodiment.

FIG. 13 shows the correspondence of basic color names with HVC values of the Munsell color system and names of 13 color such as red, red violet, purple, etc. are shown. FIGS. 17, 18 and 19 show the correspondence of system color names with HVC values of the Munsell color system and it becomes possible to express more minute color names added with such modifiers as "pale", "deep", etc. FIG. 20 shows examples of correspondence of idiomatic color names with HVC values of the Munsell color system and it is possible to specify such specific color names as "emerald green", "turquoise green", etc. which are frequently used.

That is, the color name converter 35 stores the correspondence between HVC values of the Munsell color system and color names for respective basic color names, system color names and idiomatic color names and if corresponded to HVC values of the Munsell color system for a color name on a colorimetric object, outputs that color name as a character string. The result of this output is displayed by the data output circuit 33 in the format shown in FIG. 30.

As described above, the sixth embodiment of the present invention can provide a colorimetric apparatus which outputs basic color names, system color names and idiomatic color names after converting into HVC values of the Munsell color system, which have been quantified from human perception.

Next, the seventh embodiment of the present invention will be described. Although the entire construction of this embodiment is the same as that of the sixth embodiment shown in FIG. 29, the process operations are somewhat different. The color image input device 21 reads color image information of a colorimetric object P as two-dimensional color image data and stores them as RGB color image data in the frame memories 24, 25 and 26, respectively.

The RGB color image data stored in the frame memories 24, 25 and 26 are transferred to the data converter 34 under the control by the CPU 30. Likewise the sixth embodiment described above, the data converter 34 converts the RGB values transferred from the frame memories 24, 25 and 26 into HVC values of the Munsell color system through the learning using the neural network. The converted image data (HVC values) are transferred to the color name converter 35 under the control by the CPU 30 and the converted into a color name character string by the color name converter 35. The color name converter 35 outputs basic color names, system color names and idiomatic color names according to the correspondence between HVC values of the Munsell color system and color names similar to the sixth embodiment described above.

Image data thus converted become two-dimensional image data, each of which pixel has a color name, and are output for display by the data output circuit 33.

The seventh embodiment of the present invention described above can provide a colorimetric apparatus which is capable of performing the colorimetry of a colored object as two-dimensional image data having basic color names, system color names and idiomatic color names after converting them into HVC values of the Munsell color system, which have been quantified from human perception.

Figure 31:
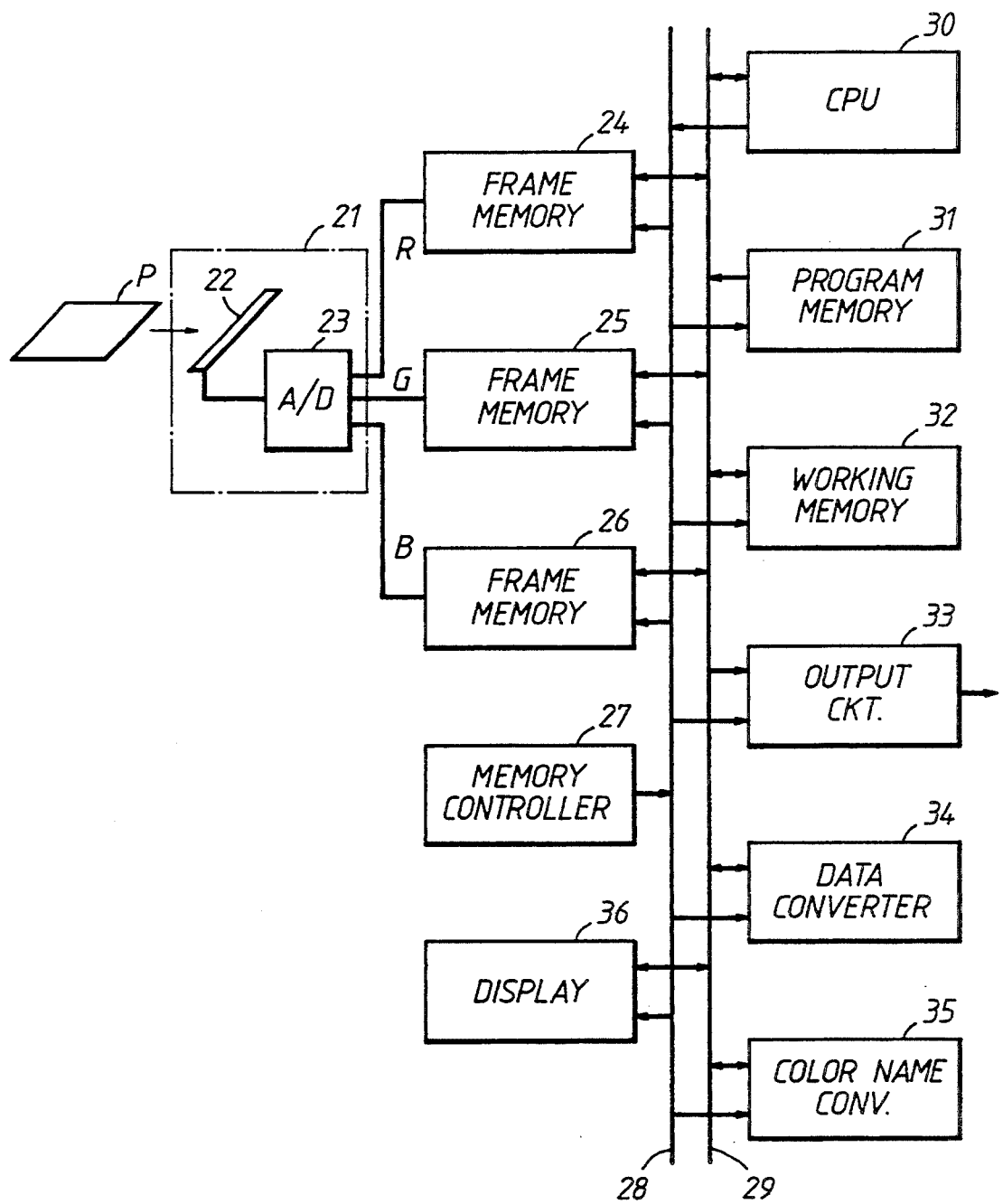
FIG. 31 is a block diagram showing the construction of the eighth embodiment of the present invention.

FIG. 31 is a block diagram showing the construction of the colorimetric apparatus involved in the eighth embodiment of the present invention. In the eighth embodiment, a display 36 with a keyboard is additionally connected to the CPU 30 through the address bus 28 and the data bus 29 to the colorimetric apparatus described in the sixth embodiment shown in FIG. 29.

The process operations of this eighth embodiment will be described hereinafter.

Similar to the sixth embodiment, the color image input device 21 reads color image information of a colorimetric object P and inputs them as RGB color image data. These RGB color image data are converted into HVC values of the Munsell color system by the data converter 34. In succession, the HVC values of the Munsell color system which are output from the data converter 34 are further converted into color name character strings by the color name converter 35. The color name converter 35 outputs basic color names, system color names and idiomatic color names according to the correspondence of HVC values of the Munsell color system with color names similar to the sixth embodiment described above.

Figures 30, 32, 33:
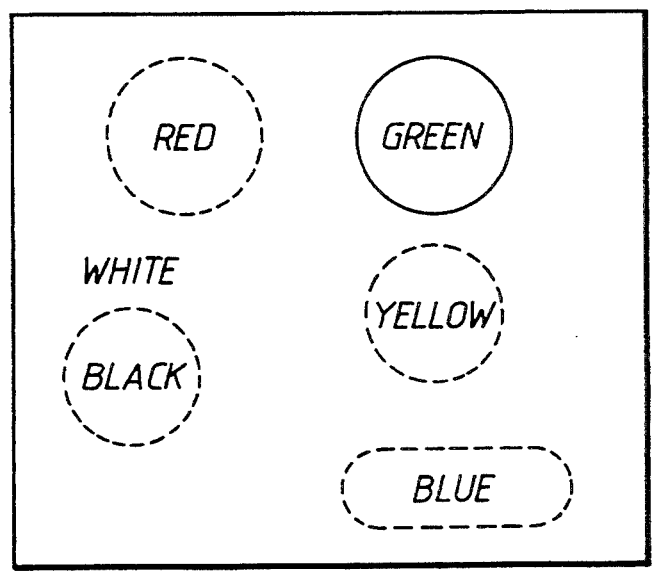
FIG. 30 is a diagram showing an example of the output of colorimetric result in the sixth embodiment.
FIG. 32 is a diagram showing an example of the display to guide input of an extracting color name in the eighth embodiment.
FIG. 33 is a diagram showing an example of the output of colorimetric result in the eighth embodiment.

Image data thus converted become two-dimensional image data, each of which pixel has HVC values of the Munsell color system as well as a color name. For this image data, a direction for entering an extracting color name is displayed on the display 36 with the keyboard as shown in FIG. 32. When a colorimetry worker inputs a color name desired to extract through the keyboard of the display the CPU extracts an area corresponding to the input color name from the converted image data described above and display it on the screen of the display 36 as shown in FIG. 33.

The eighth embodiment of the present invention described above can provide a colorimetric apparatus which obtains basic color names, system color names and idiomatic color names after converting RGB color image data into HVC values of the Munsell color system, which have been quantified from human perception, and outputs an area corresponding to a color name to be extracted which is input by a colorimetry worker.

Next, the ninth embodiment of the present invention including a reading accuracy improving function which is applicable to all the fourth through the eighth embodiments described above will be described. In this embodiment, a data averaging unit is provided for averaging read data for the plural same objects on RGB color image data which are input by the color image input device 21. For instance, image data which were input ten times are averaged according to the expression (2). Thereafter, the output of this data averaging unit is converted into HVC values of the Munsell color system.

$$R = \frac{R1 + R2 + \ldots + Rn}{n} \quad (2)$$

$$G = \frac{G1 + G2 + \ldots + Gn}{n}$$

$$B = \frac{B1 + B2 + \ldots + Bn}{n}$$

The ninth embodiment of the present invention can provide a colorimetric apparatus which is capable of collecting image data repeatedly, improving reading accuracy by averaging the collected image data and thus, assuring a highly accurate colorimetry. It will be appreciated that modifications may be made in the present invention. For instance, a conventional computer system can be used for converting RGB data into Munsell color data instead of a neural network. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A method for extracting a pattern of a specific color from an object containing a plurality of color patterns, the method comprising the steps of:

collecting data relating to color components R (Red), G (Green) and B (Blue) from the object;

converting the data collected in the collecting step into chromaticity coordinates x, y and luminous reflectance Y;

converting the chromaticity coordinates x, y and luminous reflectance Y into Munsell color data H (Hue), V (Value) and C (Chroma); and extracting a pattern of a specific color from the object based on the Munsell color data, the extraction including the steps of:

preparing a histogram based on the Munsell color data H, V and C;

defining a principal axis for the histogram where variance becomes maximum;

obtaining one-dimensional data by projecting the histogram against the principal axis; and selecting a threshold value for dividing the one-dimensional data into at least two groups respectively corresponding to different colors.

2. The method according to claim 1 further comprising the steps of:

associating a plurality of color names with regions of a Munsell color space;

converting said Munsell color data into character data representing a color name corresponding to color contained in said object, said character data being obtained in accordance with said color names associated with regions of said Munsell color space; and outputting said character data.

3. The method according to claim 1 further comprising the steps of:

associating a plurality of color names with regions of a Munsell color space; and designating a color name corresponding to said specific color of said pattern to be extracted from said object in said extracting step.

* * * * *